US012728426B2

(12) United States Patent
Kang et al.

(10) Patent No.: US 12,728,426 B2
(45) Date of Patent: Sep. 8, 2026

(54) ELECTROSTATIC PRECIPITATOR AND CONTROL METHOD THEREOF

(71) Applicant: SAMSUNG ELECTRONICS CO., LTD., Suwon-si (KR)

(72) Inventors: Myungsoo Kang, Suwon-si (KR); Kyuho Shin, Suwon-si (KR); Hyongsoo Noh, Suwon-si (KR); Myungseob Song, Suwon-si (KR); Joonoh Shin, Suwon-si (KR); Kisup Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 713 days.

(21) Appl. No.: 17/869,519

(22) Filed: Jul. 20, 2022

(65) Prior Publication Data

US 2023/0097963 A1 Mar. 30, 2023

Related U.S. Application Data

(63) Continuation of application No. PCT/KR2022/009864, filed on Jul. 7, 2022.

(30) Foreign Application Priority Data

Sep. 24, 2021 (KR) ........................ 10-2021-0126333

(51) Int. Cl.
*B03C 3/68* (2006.01)
*B03C 3/08* (2006.01)
*B03C 3/47* (2006.01)

(52) U.S. Cl.
CPC .................. *B03C 3/68* (2013.01); *B03C 3/08* (2013.01); *B03C 3/47* (2013.01)

(58) Field of Classification Search
CPC .... B03C 3/68; B03C 3/08; B03C 3/12; B03C 3/40; B03C 3/41; B03C 3/47; B03C 3/17;
(Continued)

(56) References Cited

U.S. PATENT DOCUMENTS 3,883,328 A 5/1975 Spain
4,218,225 A * 8/1980 Kirchhoff ............... B03C 3/025 96/32

(Continued)

FOREIGN PATENT DOCUMENTS

CN 110352095 A 10/2019
CN 209885989 U 1/2020

(Continued)

OTHER PUBLICATIONS

Supplementary European Search Report dated Aug. 27, 2024 issued in European Application No. EP 22 87 3077.

(Continued)

*Primary Examiner* — Jennifer Dieterle
*Assistant Examiner* — Sonji Turner
(74) *Attorney, Agent, or Firm* — STAAS & HALSEY LLP

(57) ABSTRACT

A electrostatic precipitator includes a charger configured to charge foreign substances introduced thereinto, and a dust collecting sheet on which the charged foreign substances are collected. The dust collecting sheet includes a first electrode, a second electrode spaced apart from the first electrode to face the first electrode and on which the foreign substances passed through the charger are collected, a first power connector electrically connected to the first electrode so as to apply a voltage to the first electrode, a second power connector electrically connected to the second electrode so as to apply a voltage having a potential difference with the first electrode, to the second electrode, and a third power
(Continued)

connector additionally electrically connected to the second electrode to apply additional voltage to allow the second electrode to generate heat.

10 Claims, 20 Drawing Sheets

(58) Field of Classification Search
CPC ........... B03C 3/74; B03C 3/746; B03C 3/763; B03C 3/86; B03C 2201/12; B03C 2201/26
See application file for complete search history.

(56) References Cited

U.S. PATENT DOCUMENTS

| | | | | | |
|---|---|---|---|---|---|
| 6,034,354 | A * | 3/2000 | Hironaka | B03C 3/74 219/544 |
| 6,092,387 | A * | 7/2000 | Hironaka | B03C 3/32 96/96 |
| 6,156,099 | A * | 12/2000 | Hironaka | F24F 8/167 96/28 |
| 6,178,765 | B1 * | 1/2001 | Hironaka | B03C 3/74 62/96 |
| 10,994,283 | B2 | 5/2021 | Noh et al. | |
| 2005/0116166 | A1 * | 6/2005 | Krichtafovitch | H01T 19/00 250/324 |
| 2006/0065121 | A1 * | 3/2006 | Crawley | B03C 3/68 96/55 |
| 2007/0295207 | A1 * | 12/2007 | Thomas | B03C 3/88 96/414 |
| 2013/0047846 | A1 * | 2/2013 | Ma | B03C 3/70 96/99 |
| 2018/0250685 | A1 * | 9/2018 | Noh | B03C 3/41 |
| 2018/0361399 | A1 * | 12/2018 | Williamsson | B03C 3/40 |
| 2021/0220839 | A1 * | 7/2021 | Inui | B03C 3/41 |

FOREIGN PATENT DOCUMENTS

| | | | | | |
|---|---|---|---|---|---|
| EP | 2 881 177 | B1 | | 3/2020 | |
| JP | 57-82951 | | | 5/1982 | |
| JP | 9-206628 | | | 8/1997 | |
| JP | 3287294 | B2 | | 6/2002 | |
| JP | 2004-298660 | | | 10/2004 | |
| JP | 2009-127442 | A | | 6/2009 | |
| JP | 4350180 | | | 10/2009 | |
| JP | 2013-188708 | | | 9/2013 | |
| JP | 2013188708 | A | * | 9/2013 | |
| JP | 6028348 | B2 | | 10/2016 | |
| JP | 2020-49395 | | | 4/2020 | |
| KR | 10-2014-0144271 | | | 12/2014 | |
| KR | 10-1796046 | | | 12/2017 | |
| KR | 10-2018-0101844 | | | 9/2018 | |
| KR | 10-2018-0101844 | A | | 9/2018 | |
| KR | 20180101844 | A | * | 9/2018 | B03C 3/41 |
| KR | 10-2019-0042326 | | | 4/2019 | |
| KR | 10-2126953 | B1 | | 6/2020 | |
| KR | 10-2270176 | | | 6/2021 | |

OTHER PUBLICATIONS

International Search Report dated Nov. 1, 2022 issued in PCT Application No. PCT/KR2022/009864.
Written Opinion dated Nov. 1, 2022 issued in PCT Application No. PCT/KR2022/009864.
Office Action dated Mar. 16, 2026, issued in European Application No. 22 873 077.6.
Office Action dated Apr. 30, 2026, issued in Chinese Application No. 202280036036.8.

* cited by examiner

ELECTROSTATIC PRECIPITATOR AND CONTROL METHOD THEREOF

CROSS-REFERENCE TO RELATED APPLICATION(S)

This application is a continuation application, under 35 U.S.C. § 111(a), of international application No. PCT/KR2022/009864, filed on Jul. 7, 2022, which claims priority to Korean Patent Application No. 10-2021-0126333, filed on Sep. 24, 2021 in the Korean Intellectual Property Office, the disclosure of which is incorporated by reference herein in its entirety

BACKGROUND

1. Field

The disclosure relates to an electrostatic precipitator, and more particularly, to an electrostatic precipitator including an improved sterilization function.

2. Description of Related Art

High concentrations of aerosols in homes, rooms, shopping malls, factories, and offices may cause health problems. These aerosols may be generated by smoking, cooking, cleaning, welding, grinding, etc. in confined spaces.

An electrostatic precipitator corresponding to a device for removing such aerosols may be used in an air purifier or an air conditioner having an air purifying function.

A dust collecting unit of the electrostatic precipitator includes a high voltage electrode and a low voltage electrode, and foreign substances in the air charged through the charging unit may be collected on the electrode by an electrical action. In this case, because the foreign substances collected by the electrodes contain bio-aerosols, which are microorganisms suspended in the air, there may be a problem in that these substances proliferate in the electrodes and diffuse back into the room.

SUMMARY

Therefore, it is an aspect of the disclosure to provide an electrostatic precipitator capable of collecting foreign substances on an electrode through electricity of the electrostatic precipitator and capable of sterilizing the electrode.

It is another aspect of the disclosure to provide an electrostatic precipitator and a control method of the electrostatic precipitator, capable of improving ease of manufacture and productivity by integrally forming a plurality of electrodes, which forms the dust collecting unit, with a dust collecting sheet, and efficiently connecting a power source for dust collecting and sterilization to each electrode.

Additional aspects of the disclosure will be set forth in part in the description which follows and, in part, will be obvious from the description, or may be learned by practice of the disclosure.

In accordance with an aspect of the disclosure, an electrostatic precipitator includes a charger configured to charge foreign substances introduced thereto, and a dust collecting sheet on which the charged foreign substances are collected. The dust collecting sheet includes a first electrode, a second electrode spaced apart from the first electrode to face the first electrode and on which the foreign substances passed through the charger are collected, a first power connector electrically connected to the first electrode so as to apply a voltage to the first electrode, a second power connector electrically connected to the second electrode so as to apply a voltage having a potential difference with the first electrode, to the second electrode, and a third power connector additionally electrically connected to the second electrode to supply additional voltage to allow the second electrode to generate heat.

The first electrode and the second electrode may be arranged to be overlapped with each other in a first direction, the first power connector may be arranged at one end of the dust collecting sheet in a second direction which is perpendicular to the first direction, the second power connector may be arranged at an other end of the dust collecting sheet in the second direction, and the third power connector may be arranged adjacent to the first power connector in the second direction.

The dust collecting sheet may include a first sheet provided to cover one surface of the first electrode and the second electrode in the first direction, and a second sheet provided to cover an other surface of the first electrode and the second electrode in the first direction. The first power connector and the second power connector may be arranged on the first sheet.

The third power connector may be arranged on the second sheet.

The second sheet may include a connection hole opened in the first direction to connect the second electrode and the third power connector to each other. The third power connector may be in contact with the second electrode through the connection hole.

The dust collecting sheet may include a first region in which the first sheet and the second sheet are overlapped and covered with each other in the first direction, and a second region arranged outside the second sheet in the first direction. The first power connector and the second power connector may be arranged in the second region.

The third power connector may be arranged in the first region.

At least a portion of the second electrode may be arranged in the second region, and the third power connector may be in contact with the at least a portion of the second electrode arranged in the second region.

The second electrode may be made of a metal material.

The second electrode may be made of a material having an electrical resistance greater than an electrical resistance of the first electrode.

The dust collecting sheet may further include a first plane on which the first electrode is arranged, a second plane on which the second electrode is arranged, and a bending part bent to allow the first plane and the second plane to face the first direction. At least a portion of each of the first power connector, the second power connector, and the third power connector may be arranged in the bending part.

Each of the first power connector, the second power connector, and the third power connector may be extended along the first plane, the bending part, and the second plane, sequentially.

The electrostatic precipitator may further include a first power supplier electrically connected to the first power connector, a second power supplier electrically connected to the second power connector, a third power supplier electrically connected to the third power connector, and a controller configured to control the first power supplier, the second power supplier, and the third power supplier to respectively supply power to the first power connector, the second power connector, and the third power connector. The controller may be configured to control the first power supplier, the second power supplier, and the third power supplier so as to selectively drive one of a first operation mode, in which the first power supplier and the second power supplier are controlled to apply a voltage to the first power connector and the second power connector, and a second operation mode, in which the second power supplier and the third power supplier are controlled to apply power to the second power connector and the third power connector.

The controller may be configured to, based on a first selected time or an input value, control the first operation mode to be turned off after being turned on, and in response to the first operation mode being turned off, the controller may be configured to control the second operation mode to be turned off after being turned on for a second selected time.

In accordance with another aspect of the disclosure, an electrostatic precipitator includes a charger configured to charge foreign substances introduced thereto, a dust collecting sheet including a first electrode, a second electrode spaced apart from the first electrode to face the first electrode and on which the foreign substances passed through the charging unit are collected, a first power connector connected to the first electrode so as to apply a voltage to the first electrode, a second power connector electrically connected to the second electrode so as to apply a voltage having a potential difference with the first electrode, to the second electrode, and a third power connector additionally electrically connected to the second electrode to apply additional voltage to allow the second electrode to generate heat, a first power supplier electrically connected to the first power connector, a second power supplier electrically connected to the second power connector, a third power supplier electrically connected to the third power connector, and a controller configured to control the first power supplier, the second power supplier, and the third power supplier to respectively supply power to the first power connector, the second power connector, and the third power connector. The controller is configured to control the first power supplier, the second power supplier, and the third power supplier to selectively drive one of a first operation mode, in which the foreign substances passed through the charger are collected on the second electrode, and a second operation mode, in which the second electrode generates the heat.

The controller may be configured to control the first power supplier and the second power supplier to simultaneously apply voltage to the first power connector and the second power connector in the first operation mode, and configured to control the second power supplier and the third power supplier to allow current to flow to the second power connector and the third power connector in the second operation mode.

The controller may be configured to, based on a first selected time or an input value, control the first operation mode to be turned off after being turned on, and in response to the first operation mode being turned off, the controller may be configured to control the second operation mode to be turned off after being turned on for a second selected time.

In accordance with another aspect of the disclosure, an electrostatic precipitator includes a charger configured to charge foreign substances introduced thereto, and a first electrode, a second electrode spaced apart from the first electrode to face the first electrode, a first power connector electrically connected to the first electrode to apply a voltage to the first electrode, a second power connector electrically connected to the second electrode to apply a voltage lower than the voltage applied to the first electrode, to the second electrode to allow the foreign substances passed through the charger to be collected on the second electrode, and a third power connector electrically connected to the second electrode, together with the second power connector to allow current to flow to the second electrode, the third power connector configured to allow the second electrode to generate heat.

The electrostatic precipitator may further include a first power supplier electrically connected to the first power connector, a second power supplier electrically connected to the second power connector, a third power supplier electrically connected to the third power connector, and a controller configured to control the first power supplier, the second power supplier, and the third power supplier to respectively supply power to the first power connector, the second power connector, and the third power connector. The controller is configured to control the first power supplier, the second power supplier, and the third power supplier to selectively drive one of a first operation mode, in which the foreign substances passing through the charger are collected on the second electrode, and a second operation mode, in which the second electrode generates the heat.

The controller may be configured to control the first power supplier and the second power supplier to simultaneously apply voltage to the first power connector and the second power connector in the first operation mode, and configured to control the second power supplier and the third power supplier to allow current to flow to the second power connector and the third power connector in the second operation mode.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
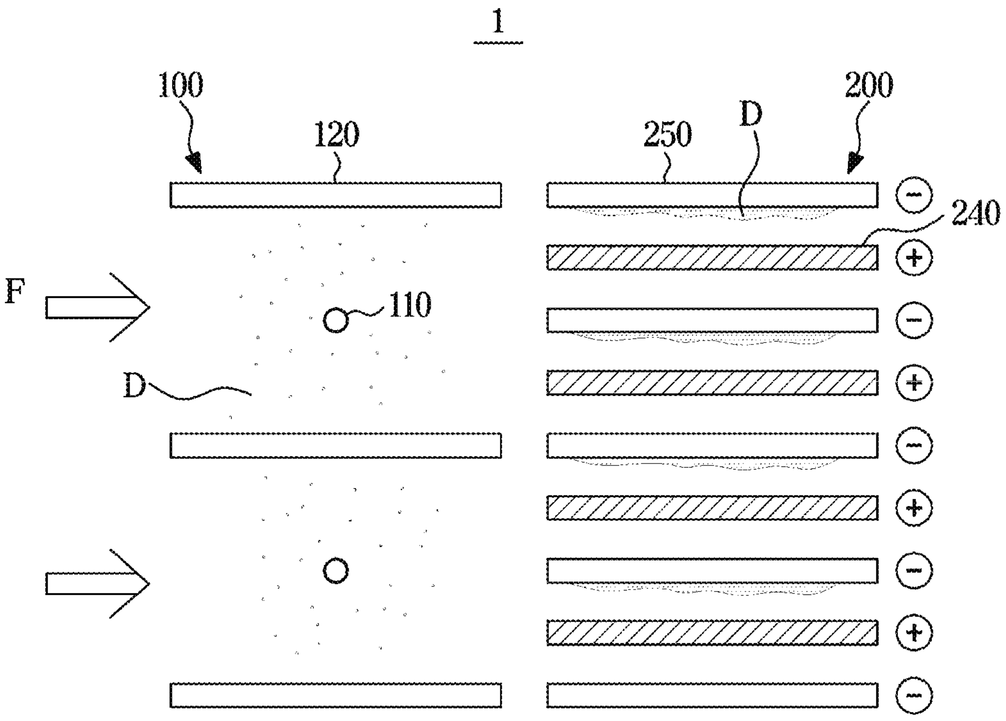
FIG. 1 is a diagram illustrating an electrostatic precipitator according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left", "right" and the like may be defined by the drawings, but the shape and the location of the component is not limited by the term.

In addition, in the following description, a positive electrode represents an electrode having a high potential level and a negative electrode represents an electrode having a low potential level based on a potential difference.

Hereinafter an embodiment according to the disclosure will be described in detail with reference to the accompanying drawings.

Figure 2:
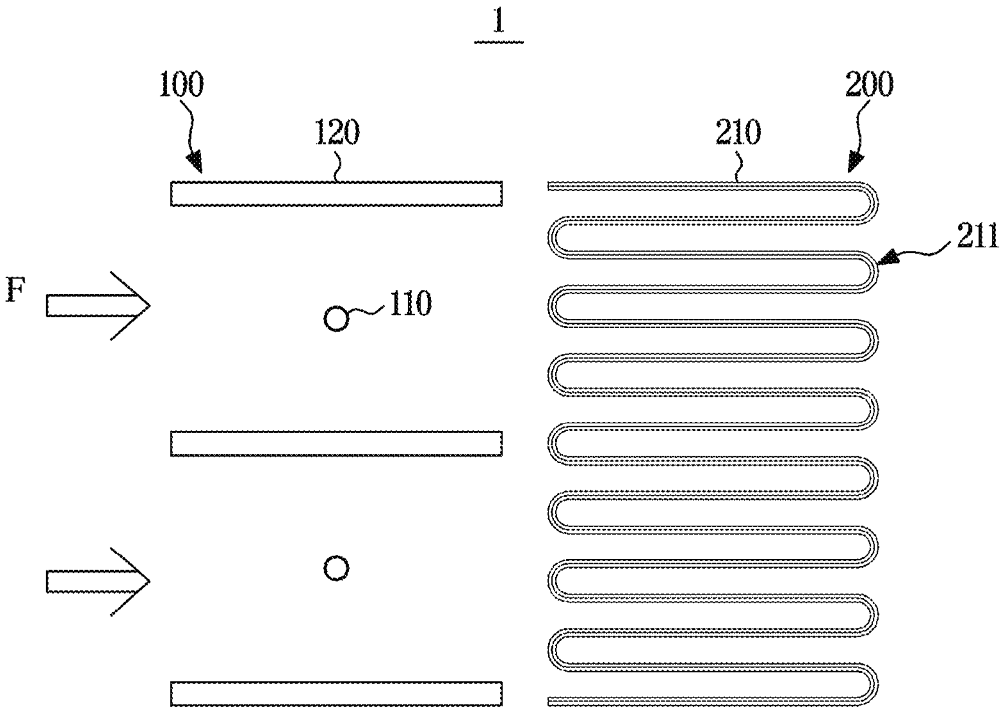
FIG. 2 is a diagram schematically illustrating the electrostatic precipitator according to an embodiment of the disclosure.

FIG. 1 is a diagram illustrating an electrostatic precipitator according to an embodiment of the disclosure, and FIG. 2 is a diagram schematically illustrating the electrostatic precipitator according to an embodiment of the disclosure.

Referring to FIGS. 1 and 2, an electrostatic precipitator 1 according to an embodiment of the disclosure includes a charging unit 100 and a dust collecting unit 200.

The electrostatic precipitator 1 is arranged in a housing (not shown) and thus outside air, which is introduced to the charging unit 100 through a blower fan (not shown) arranged on upstream or downstream of the electrostatic precipitator 1, passes through the dust collecting unit 200 and is discharged back to the outside. The electrostatic precipitator 1 according to an embodiment of the disclosure may be implemented as an air purifier or an air conditioner that has an air purifying function, and the electrostatic precipitator 1 may be arranged inside the air conditioner.

The charging unit 100 is configured to charge contaminants in the air, such as dust, and includes a plurality of discharge electrodes 110 and a plurality of counter electrodes 120. A single discharge electrode 110 is arranged between the pair of counter electrodes 120. Therefore, in response to a predetermined voltage being applied to the discharge electrode 110 and the counter electrode 120, corona discharge may occur between the one discharge electrode 110 and the pair of counter electrodes 120, and accordingly, contaminants passing through the charging unit 100 may be charged.

The discharge electrode 110 may be formed of a wire electrode, and for example, a tungsten wire may be used as the discharge electrode 110. The counter electrode 120 may be formed in a flat plate shape, and may be formed of a conductive metal plate. As an example, the counter electrode 120 may be formed of an aluminum plate.

The above-described charging unit 100 may typically have a wire-plate structure using high voltage discharge, but the charging unit 100 may include various means configured to charge contaminants to a specific polarity in addition to the electric discharge using a carbon brush electrode or needle-shaped electrode.

The dust collecting unit 200 is configured to collect dust charged in the charging unit 100, and includes a dust collecting sheet 210 formed in a shape in which one sheet is continuously bent.

The dust collecting sheet 210 includes a plurality of bending members 211 that is formed by continuously bending a single dust collecting sheet 210 in the form of a zigzag. For example, as shown in FIG. 2, the dust collecting sheet 210 in an unfolded state may have a rectangular shape, in which a length in the vertical direction is greater than a width in the horizontal direction, based on FIG. 2, and the dust collecting sheet 210 may be continuously bent in the form of a zigzag along the longitudinal direction, so as to form the plurality of bending members 211. However, the dust collecting sheet is not limited thereto, and the length in the horizontal direction may be greater than the length in the vertical direction. Further, the dust collecting sheet 210 may include a plurality of bending members that is formed by being continuously bent in the horizontal direction according to a shape of the electrostatic precipitator 1 including the dust collecting unit 200.

The dust collecting unit 200 may be provided such that the plurality of bending members 211 is arranged between the pair of counter electrodes 120 of the charging unit 100. As an example, the dust collecting unit 200 may be provided such that ten (10) bending members 211 are arranged between the pair of counter electrodes 120 of the charging unit 100. Accordingly, the charged contaminants introduced into the dust collecting unit 200 may be effectively adsorbed to the dust collecting unit 200. A detailed configuration of the dust collecting unit 200 will be described later.

Figure 3:
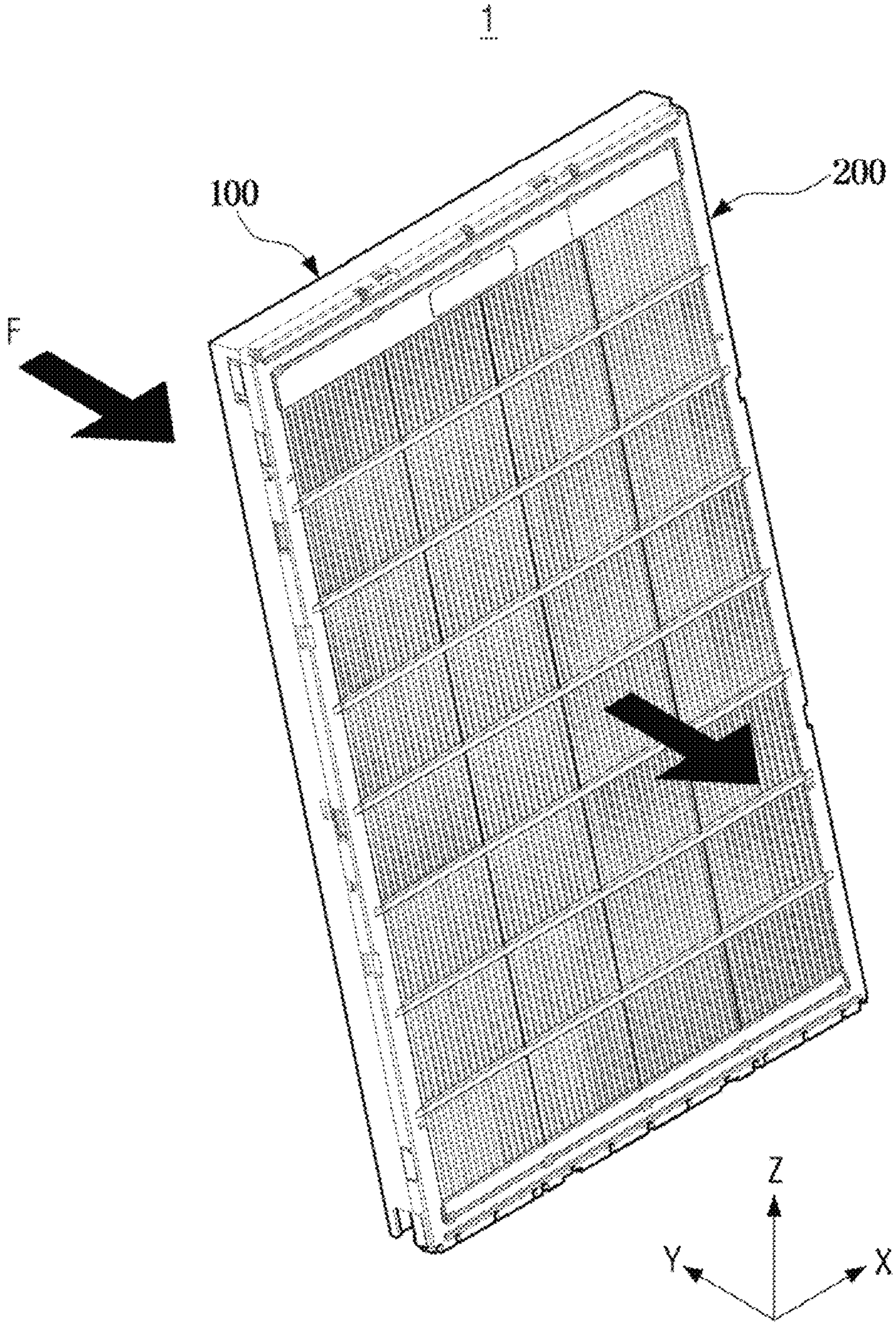
FIG. 3 is a perspective view illustrating the electrostatic precipitator according to an embodiment of the disclosure.
Figure 4:
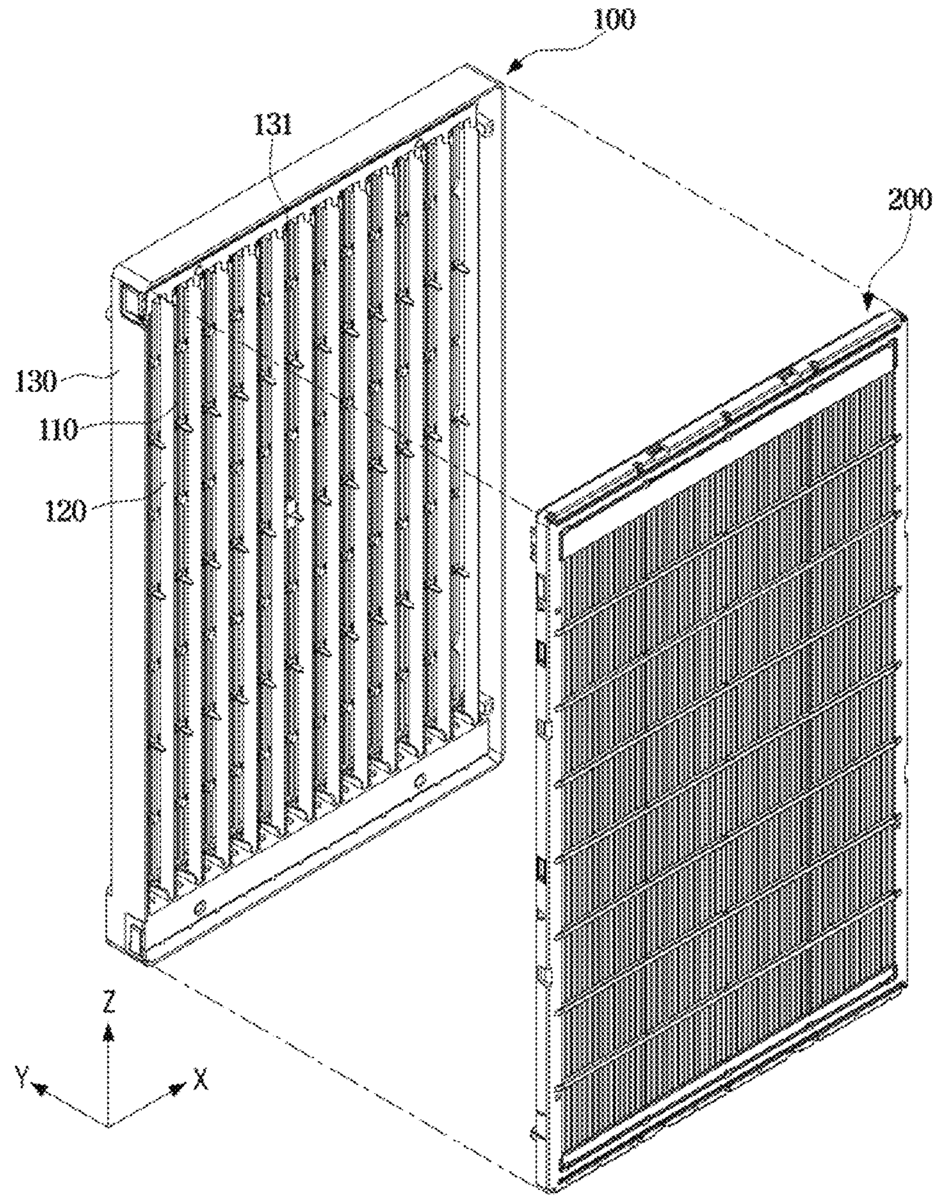
FIG. 4 is an exploded-perspective view illustrating the electrostatic precipitator shown in FIG. 3.

FIG. 3 is a perspective view illustrating the electrostatic precipitator according to an embodiment of the disclosure, and FIG. 4 is an exploded-perspective view illustrating the electrostatic precipitator shown in FIG. 3.

As illustrated in FIGS. 3 and 4, the electrostatic precipitator 1 includes the charging unit 100 and the dust collecting unit 200 coupled to the charging unit 100 to face each other. Accordingly, the contaminants in the outside air may be removed while sequentially passing through from the charging unit 100 to the dust collecting unit 200 in F direction shown in FIG. 3.

As described above, the charging unit 100 includes the plurality of discharge electrodes 110 and the plurality of counter electrodes 120 respectively arranged between the plurality of discharge electrodes 110, and also includes a charging cover 130 provided to support the plurality of discharge electrodes 110 and the plurality of counter electrodes 120.

As shown in FIG. 4, the plurality of discharge electrodes 110 and the plurality of counter electrodes 120 may be formed in a shape in which the plurality of discharge electrodes 110 and the plurality of counter electrodes 120 extend along a longitudinal direction (Z direction in FIG. 4) of the charging cover 130 inside the charging cover 130, and the plurality of discharge electrodes 110 and the plurality of counter electrodes 120 may be alternately arranged in parallel along the width direction (X direction in FIG. 4) of the charging cover 130.

The plurality of discharge electrodes 110 may be formed of a metal wire such as a tungsten wire, and the plurality of counter electrodes 120 may be formed of a metal plate such as an aluminum plate extending along a longitudinal direction of the plurality of discharge electrodes 110.

In response to the high voltage applied to the discharge electrode 110, the contaminants contained in the air may be charged to the positive (+) pole or the negative (−) pole through the corona discharge between the discharge electrode 110 and the counter electrode 120. Hereinafter for convenience of explanation, it will be described as an example that contaminants in the air passing through the charging unit 110 are charged with a positive pole by applying a positive pole power to the discharge electrode 110.

The charging cover 130 may be in the shape of a frame for fixing opposite ends of the plurality of discharge electrodes 110 and the plurality of counter electrodes 120, and includes a plurality of suction ports 131 formed therein in a grid shape. Accordingly, outside air may be introduced through the plurality of suction ports 131 of the charging cover 130, and contaminants contained in the introduced air may be charged through the corona between the plurality of discharge electrodes 110 and the plurality of counter electrodes 120 and then moved to the dust collecting unit 200 arranged downstream of the charging unit 100.

However, the above-described charging unit 100 is the same as or similar to the prior art, and thus an additional detailed description will be omitted.

Figure 5:
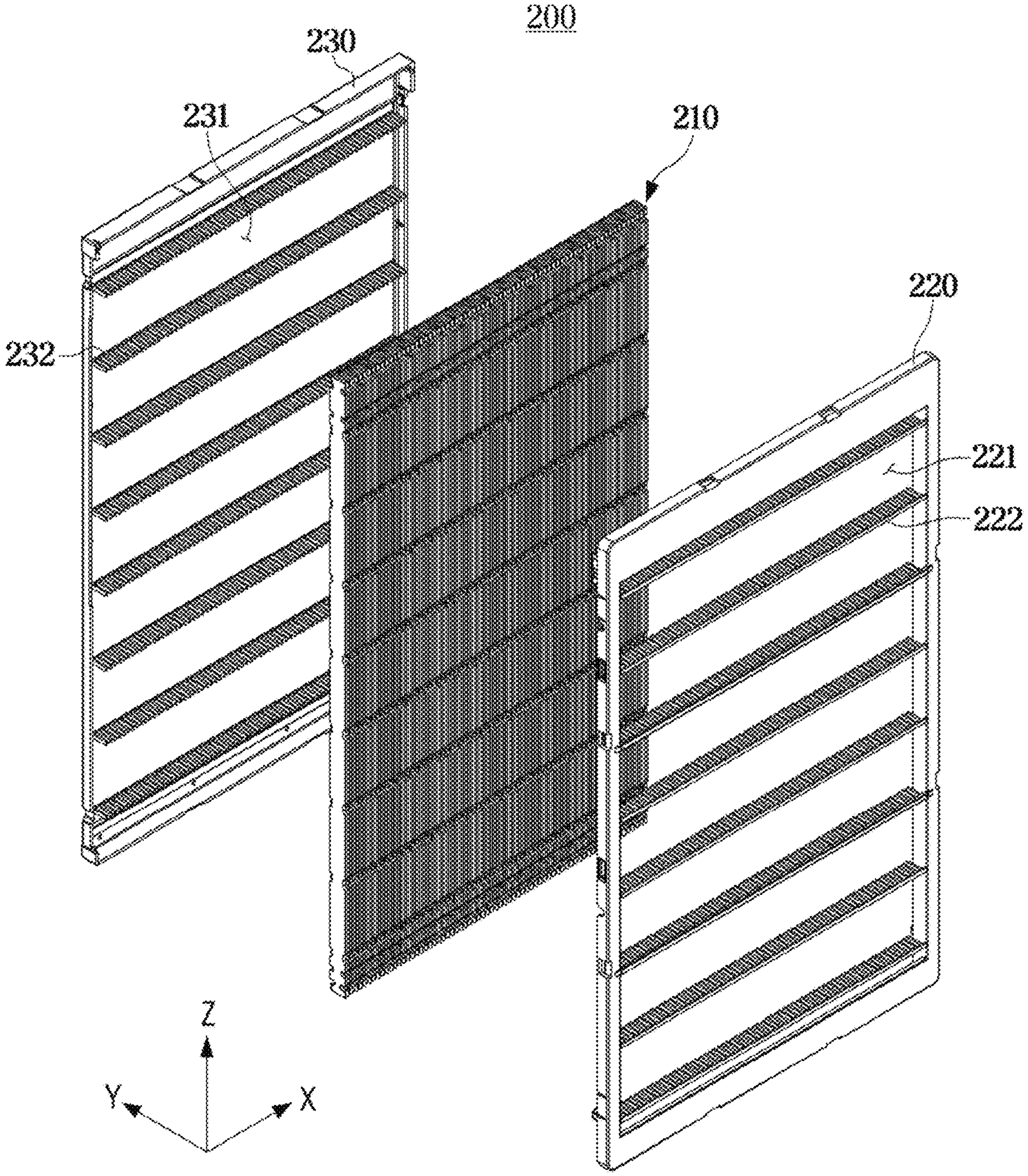
FIG. 5 is an exploded-perspective view illustrating a dust collecting unit shown in FIG. 4.

FIG. 5 is an exploded-perspective view of the dust collecting unit 200 shown in FIG. 4.

Referring to FIG. 5, the dust collecting unit 200 includes the dust collecting sheet 210 including the plurality of bending members 211 formed thereon, and first and second covers 220 and 230 provided to cover the dust collecting sheet 210.

The first and second covers 220 and 230 may be in the shape of a frame surrounding the outside of the dust collecting sheet 210, and the air passing through the charging unit 100 may pass through the dust collecting sheet 210 through openings 221 and 231 formed therein.

As described above, the dust collecting sheet 210 may be provided to be bent in the form of a zigzag to include the plurality of bending members, and thus the dust collecting sheet 210 may include a plurality of support members 222 and 232 formed inside the first and second covers 220 and 230 so as to support the dust collecting sheet 210.

The plurality of support members 222 and 232 may be arranged at a predetermined distance on the openings 221 and 231 of the first and second covers 220 and 230, and may stably support the dust collecting sheet 210.

In addition, a power connection member (not shown) connected to the dust collecting sheet 210 to apply power to the dust collecting sheet may be arranged on the first and second covers 220 and 230.

Figure 6:
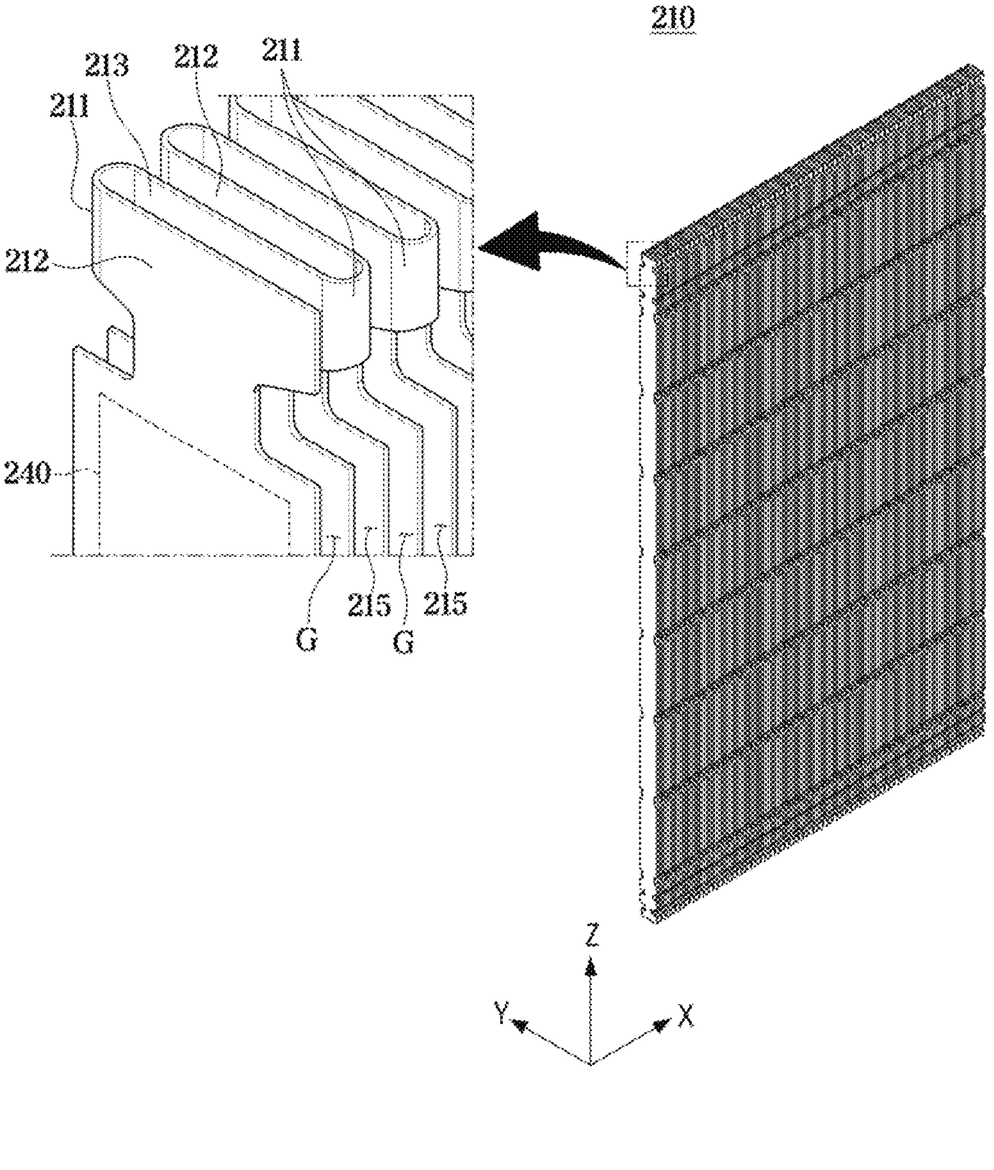
FIG. 6 is an enlarged-perspective view illustrating a part of a dust collecting sheet shown in FIG. 5.
Figure 7:
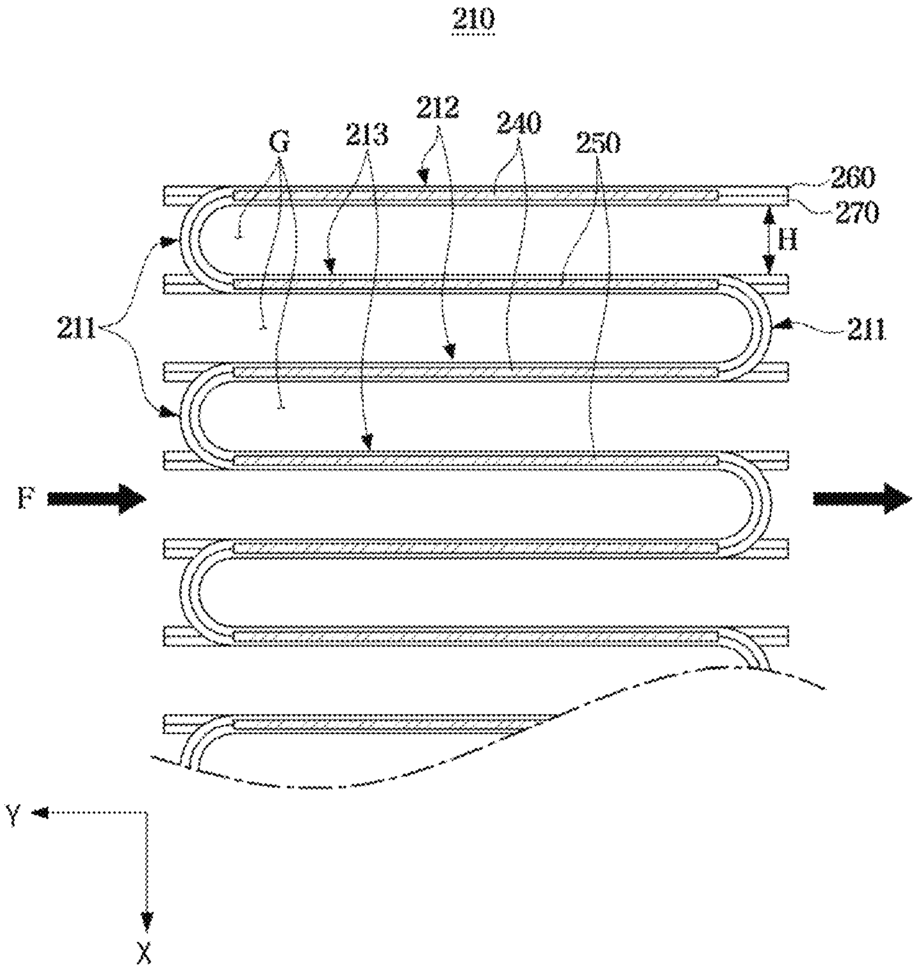
FIG. 7 is a side cross-sectional view illustrating the dust collecting sheet shown in FIG. 6.

FIG. 6 is an enlarged-perspective view illustrating a part of the dust collecting sheet shown in FIG. 5, and FIG. 7 is a side cross-sectional view illustrating the dust collecting sheet shown in FIG. 6.

Hereinafter a detailed configuration of the dust collecting sheet 210 bent in the form of a zigzag will be described with reference to FIGS. 6 and 7. FIG. 6 illustrates an example in which the dust collecting sheet 210 includes the plurality of bending members 211 by bending the dust collecting sheet 210, which is formed in the rectangular shape in which the length in the horizontal direction is greater than the width in the vertical direction before being bent, in the form of a zigzag along the horizontal direction. However, the shape of the dust collecting sheet 210 before being bent may vary according to the shape of the electrostatic precipitator 1, and a bending direction of the dust collecting sheet 210 in the unfolded state before being bent may vary, as described above.

In addition, for convenience of description, FIG. 7 illustrates a side cross-sectional view of the dust collecting sheet 210 in a state of being rotated by 90 degrees from the dust collecting sheet 210 shown in FIG. 6. The horizontal direction, the vertical direction, the width direction or the longitudinal direction of the dust collecting sheet 210 to be described below are relative concepts defined according to the viewing direction, and the horizontal direction, the vertical direction, the width direction or the longitudinal direction of the dust collecting sheet 210 may vary according to the reference.

As shown in FIG. 7, the dust collecting sheet 210 includes a plurality of first electrodes 240 and a plurality of second electrodes 250 alternately arranged therein.

As described above, the dust collecting sheet 210 may form the plurality of bending members 211 by bending the flat dust collecting sheet 210, which is composed of a single sheet, in the form of a zigzag, and the dust collecting sheet 210 may be provided as a single dust collecting sheet 210 by laminating a second sheet 270 (refer to FIG. 8) to one surface of a first sheet 260 (refer to FIG. 8) on which the plurality of first electrodes 240 and the plurality of second electrodes 250 is arranged. A configuration of the dust collecting sheet 210 including the first and second sheets 260 and 270 will be described later.

The plurality of bending members 211 is formed by bending the dust collecting sheet 210 in the form of a zigzag to allow the plurality of first electrodes 240 and the plurality of second electrodes 250 to face each other.

Particularly, the dust collecting sheet 210 includes a plurality of planes 212 and 213 arranged to face each other at a predetermined distance through bending, and the plurality of bending members 211 is arranged between the two opposing planes 212 and 213, which face each other among the plurality of planes 212 and 213, so as to connect the two planes 212 and 213.

A pair of planes 212 and 213 facing each other may be composed of a first plane 212 and a second plane 213, and on the dust collecting sheet 210, a plurality of first planes 212 and a plurality of second planes 213 may be alternately and continuously arranged in parallel to each other. The bending member 211 connecting the first plane 212 to the second plane 213 is formed by bending the dust collecting sheet 210 in the form of a zigzag, and thus the bending members 211 are formed in the form of a zigzag in directions opposite to each other.

In addition, the first electrode 240 is arranged on the first plane 212 and the second electrode 250 is arranged on the second plane 213. Accordingly, the plurality of first electrodes 240 and the plurality of second electrodes 250 alternately arranged inside the dust collecting sheet 210 may be arranged to face each other by the plurality of bending members 211.

The plurality of first electrodes 240 and the plurality of second electrodes 250 alternately arranged inside the dust collecting sheet 210 may be formed in an approximate rectangular shape extending along the width direction (Z direction in FIG. 6) of the dust collecting sheet 210.

As shown in FIGS. 6 and 7, the bending member 211 may be bent to form a curved surface between the first plane 212 and the second plane 213 of the dust collecting sheet 210. In addition, the bending member 211 may be in the shape of a plane that is bent in the vertical direction from the first plane 212 and the second plane 213, and, in addition, the bending member 211 may be in the shape of an edge formed by folding between the first plane 212 and the second plane 212 of the dust collecting sheet 210 in a straight line.

The plurality of bending members 211 of the dust collecting sheet 210 may be formed between the plurality of first electrodes 240 and the plurality of second electrodes 250. Accordingly, the plurality of bending members 211 is formed in the form of a zigzag between the plurality of first electrodes 240 and the plurality of second electrodes 250 along the longitudinal direction (X direction in FIG. 6) of the dust collecting sheet 210.

The first plane 212 including the first electrode 240 may be arranged on one side of the bending member 211, and the second plane 213 including the second electrode 250 may be arranged on the other side of the bending member 211 to face the first plane 212. Accordingly, the plurality of first electrodes 240 and the plurality of second electrodes 250 may be alternately stacked in the longitudinal direction of the dust collecting sheet 210.

In addition, the first plane 212 including the first electrode 240 arranged thereon, the bending member 211, and the second plane 213 including the second electrode 250 arranged thereon are continuously arranged, and thus contaminants in the air passing between the plurality of first planes 212 and the plurality of second planes 213 may be easily collected.

The dust collecting sheet 210 includes a plurality of openings 215 respectively formed in the plurality of bending members 211. Accordingly, the dust collecting sheet 210 may pass the air, which is introduced to one side through the charging unit 100, through the plurality of openings 215.

As illustrated in FIGS. 6 and 7, the plurality of first planes 212 and the plurality of second planes 213 face each other, and thus a gap G, through which air passes, is formed between the plurality of first planes 212 and the plurality of second planes 213.

Therefore, the air passing through the charging unit 100 may be introduced into the gap G, and the air passing through the gap G may pass through the dust collecting sheet 210 by passing through the opening 215 formed in the bending member 211 corresponding to the gap G.

In addition, because the plurality of bending members 211 is formed in the form of a zigzag, the air passing through the charging unit 100 may be first introduced to the opening 215 formed in the bending member 211, and the air introduced into the opening 215 may pass through the dust collecting sheet 210 by passing through the gap G corresponding to the opening 215.

As mentioned above, the dust collecting sheet 210 may pass air through the gap G formed between the first plane 212 and the second plane 213 and through the opening 215 formed in the bending member 211.

By applying power having different polarities to the plurality of first electrodes 240 and the plurality of second electrodes 250 respectively arranged inside the plurality of first planes 212 and the plurality of second planes 213 facing each other, an electric field may be formed between the first electrode 240 and the second electrode 250.

Particularly, the plurality of first electrodes 240 may be provided as a high voltage electrode, and the plurality of second electrodes 250 may be provided as a low voltage electrode having a lower voltage than that of the first electrode 240. For example, a voltage difference between the first electrode 240 and the second electrode 250 may be formed by applying high voltage power to the plurality of first electrodes 240 and by grounding the plurality of second electrodes 250.

In addition, by applying a positive pole power to the plurality of first electrodes 240, and by applying a negative pole power to the plurality of second electrodes 250, an electric field may be formed between the first electrode 240 and the second electrode 250. Alternatively, by applying a positive pole of high voltage to the plurality of first electrodes 240, and by grounding the plurality of second electrodes 250, an electric field may be formed between the first electrode 240 and the second electrode 250.

Accordingly, the contaminants, which are charged to the positive pole by passing through the charging unit 100, may be adsorbed on the second electrode 250 corresponding to the negative electrode, that is on the second plane 213 included in the second electrode 250, while passing through the gap G between the first plane 212 and the second plane 213 (refer to FIG. 1).

In addition, in a state of charging the contaminants passing through the charging unit 100 to a negative pole by applying a negative pole of high voltage to the discharge electrode 110, the contaminants may be may be adsorbed on the second plane 213 including the plurality of second electrodes 250 corresponding to a positive electrode, by applying the negative pole of high voltage to the plurality of first electrodes 240 of the dust collecting unit 200.

As mentioned above, the air containing the charged contaminants may be purified because the contaminants are adsorbed on the plurality of second electrodes 250 while the air passes the plurality of gaps G formed by bending the dust collecting sheet 210 in the form of a zigzag.

In addition, the dust collecting sheet 210 may further include a separate space holding member (not shown) provided to maintain a height H (or size) of the gap G to be constant by maintaining a space between the first plane 212 and the second plane 213 to be constant.

The space holding member may be arranged between the first plane 212 and the second plane 213 to support the first plane 212 and the second plane 213 at a predetermined distance, and by varying a height of the space holding member, it is possible to set the height H of the gap G corresponding to the height of the space holding member.

Particularly, the space holding member may be formed on the dust collecting sheet 210 to have a predetermined width and height as a heat meltable adhesive such as hot melt, or the space holding member may be formed by attaching a double-sided adhesive having a predetermined width and height to the dust collecting sheet 210.

For example, in a state in which the space holding member is continuously applied to one surface of the unfolded dust collecting sheet 210 before bending the dust collecting sheet 210 and in a state in which the bending member 211 is formed by bending the dust collecting sheet 210 in the form of a zigzag, it is possible to set the height of the space holding member to allow a sum of the heights of the two space holding members in contact with each other to be equal to a predetermined height H of the gap G.

That is, in a state in which the space holding member having a height that is ½ of the height H of the gap G is formed on an upper surface of the unfolded dust collecting sheet 210, the first plane 212 and the second plane 213 facing each other may be supported by the space holding member upon bending the dust collecting sheet 210, and thus the height H of the gap G formed between the first plane 212 and the second plane 213 may be maintained at an appropriate distance.

Alternatively, in addition to the above-described hot melt, the space holding member may be formed of an elastic conductive material or formed in the form of a point or a column arranged between the first plane 212 and the second plane 213.

However, it is appropriate that the space holding member includes a uniform and narrow width as possible, so as not to interfere with the flow of air passing through the gap G and so as to minimize interference with the formation of an electric field between the first electrode 240 and the second electrode 250.

Figure 8:
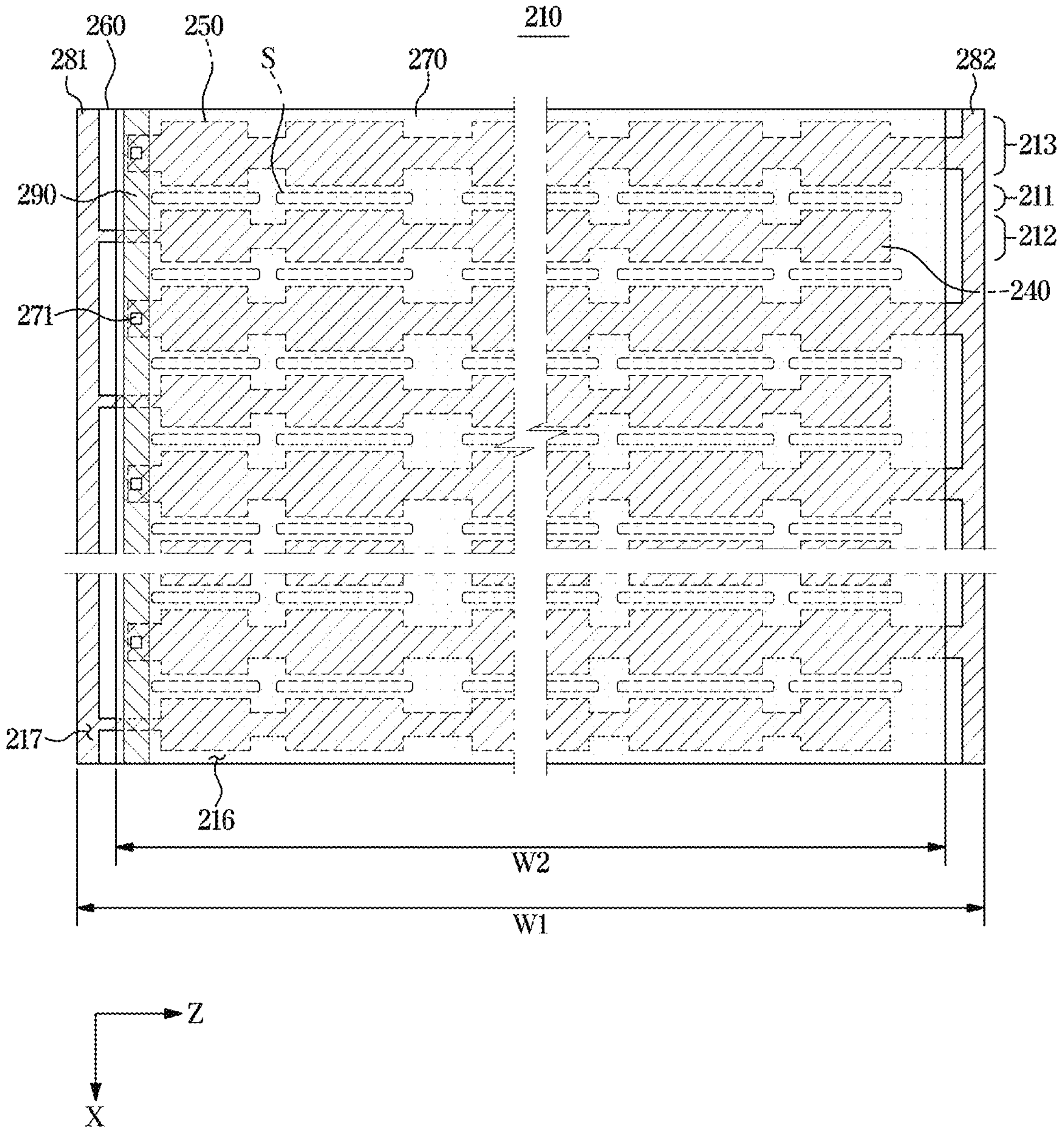
FIG. 8 is a plan view illustrating a state in which the dust collecting sheet shown in FIG. 7 is unfolded before being bent.

FIG. 8 is a plan view illustrating a state in which the dust collecting sheet shown in FIG. 7 is unfolded before being bent.

The dust collecting sheet 210 shown in FIGS. 6 and 7 may be formed by first manufacturing the dust collecting sheet 210 that is unfolded shown in FIG. 8 and then bending the dust collecting sheet 210 in the form of a zigzag.

Hereinafter a structure of the dust collecting sheet 210 including the first and second sheets 260 and 270 will be described in detail with reference to FIG. 8.

The plan view of the dust collecting sheet 210 shown in FIG. 8 illustrates that the dust collecting sheet 210 shown in FIG. 6 is unfolded after being rotated by 90 degrees. The horizontal direction, the vertical direction, the width direction or the longitudinal direction of the dust collecting sheet 210 to be described below are relative concepts defined according to the viewing direction, and the horizontal direction, the vertical direction, the width direction or the longitudinal direction of the dust collecting sheet 210 may vary according to the reference.

The dust collecting sheet 210 includes the first sheet 260 and the second sheet 270 laminated to the first sheet 260, and accordingly, the first and second sheets 260 and 270 are integrated so as to form a single dust collecting sheet 210.

Particularly, as the plurality of first electrodes 240 and the plurality of second electrodes 250 is alternately arranged on one surface of the first sheet 260, and the second sheet 270 is coupled to the one surface of the first sheet 260 on which the plurality of first electrodes 240 and the plurality of second electrodes 250 is arranged, the plurality of first electrodes 240 and the plurality of first electrodes 240 may be arranged between the first sheet 260 and the second sheet 270. The first sheet 260 and the second sheet 270 may be laminated through an adhesive.

It is appropriate that the first sheet 260 is provided in a film shape formed of PET, but is not limited thereto.

It is appropriate that the second sheet 270 is provided in a film shape formed of an Ethylene Vinyl Acetate (EVA) material, but is not limited thereto.

The plurality of first and second electrodes 240 and 250 is alternately arranged on one surface of the first sheet 260 at the predetermined distance. The plurality of first and second electrodes 240 and 250 may be formed of a conductive pattern printed or deposited on one surface of the first sheet 260, or the plurality of first and second electrodes 240 and 250 may be formed by printing conductive carbon ink on one surface of the first sheet 260.

However, the disclosure is not limited thereto, and the first and second electrodes 240 and 250 may be formed of a carbon film or a conductive metal such as aluminum and deposited on the first sheet 260.

In addition, a first power connector 281 connected to the plurality of first electrodes 240 to apply power to the plurality of first electrodes 240, and a second power connector 282 connected to the plurality of second electrodes 250 to apply power to the plurality of second electrodes 250 may be arranged on one surface of the first sheet 260.

The first and second power connectors 281 and 282 may be formed of a conductive pattern printed or deposited on one surface of the first sheet 260 in the same manner as the plurality of first and second electrodes 240 and 250.

The first and second power connectors 281 and 282 are exposed to the outside of the dust collecting sheet 210 to receive power from the outside. For this, a width W1 of the first sheet 260 is provided to be greater than a width W2 of the second sheet 270, and the first power connector 281 is arranged at one end of the first sheet 260, and the second power connector 282 is arranged at the other end of the first sheet 260.

In addition, the second sheet 270 is coupled to a central portion of one surface of the first sheet 260 to allow the first and second power connectors 281 and 282 to be exposed to the outside on the first sheet 260. The plurality of first electrodes 240 and the plurality of second electrodes 250 respectively connected to the first and second power connectors 281 and 282 may be arranged between the first sheet 260 and the second sheet 270.

In addition, the plurality of first electrodes 240 may be provided as high voltage electrodes because the high voltage power is applied from the outside to the first power connector 281, and the plurality of second electrodes 250 may be provided as a low voltage electrode because the second power connector 282 is grounded.

A third power connector 290 connected to the second electrode 250 to apply power to the second electrode 250 so as to heat the second electrode 250 may be arranged on the second sheet 270.

Accordingly, the second electrode 250 may be heated by additional power applied to the second electrode 250 and foreign substances collected in the second electrode 250 may be sterilized. This will be described later in detail.

The dust collecting sheet 210 includes a plurality of slits S formed between the plurality of first electrodes 240 and the plurality of second electrodes 250.

As shown in FIG. 8, the plurality of slits S may be a cut-out part penetrating the dust collecting sheet 210. The plurality of slits S may be formed in the plurality of bending members 211 and opened by bending the dust collecting sheet 210, thereby forming the plurality of openings 215 through which air passes. Further, the plurality of slits S may be formed in the shape of a hole occupying a certain area in the dust collecting sheet 210 in the unfolded state.

The dust collecting sheet 210 may form the plurality of bending members 211 by bending between the plurality of first electrodes 240 and the plurality of second electrodes 250, and thus the plurality of slits S may be formed on a central portion between the first electrode 240 and the second electrode 250 on the dust collecting sheet 210.

As described above, by bending the center between the plurality of first electrodes 240 and the plurality of second electrodes 250, in the form of a zigzag, the dust collecting sheet 210 may form the plurality of bending members 211 to allow the first electrode 240 and the second electrode 250 to face each other.

In addition, the plurality of slits S may be formed parallel to the first and second electrodes 240 and 250 along the longitudinal direction of the first and second electrodes 240 and 250, so as to be arranged in the central portion of the bending member 211. Accordingly, the opening 215 may be formed in the central portion of the bending member 211.

As shown in FIG. 8, the bending member 211 may be partitioned between one edge of the first electrode 240 and one edge of the second electrode 250 adjacent to each other, and the first plane 212, the bending member 211, and the second plane 213 may be defined by bending the dust collecting sheet 210 with respect to the slit S formed in the central portion between the first electrode 240 and the second electrode 250.

As described above, in response to a potential difference generated by applying different voltages to the first electrode 240 and the second electrode 250, foreign substances, which are charged by passing through the charging unit 100, may be collected on the second electrode 250 or the second surface 213 (refer to FIG. 1).

In a conventional manner, as particles such as charged foreign substances are maintained on the electrode corresponding to the second electrode 250, there may be a difficulty in that bacteria, viruses, and allergens collected on the electrode surface are maintained or propagated. A part of the particles collected on the electrode surface may be re-desorbed and re-scattered in some cases, and thus bioaerosols such as bacteria and viruses may be diffused into the room. Therefore, it is required to sterilize a collection region corresponding to the second electrode 250.

In order to ease the difficulty, in the conventional manner, an electrostatic precipitator capable of sterilization using UV and plasma discharge is disclosed. In this case, there is a risk of generating harmful by-products such as ozone.

In addition, in the case of the sterilization method using a heating element, harmful substances are not generated in comparison with the above-mentioned such as UV discharge. However, it is required to heat the entire air passing through the electrostatic precipitator, thereby increasing power consumption.

In order to ease the difficulty, the electrostatic precipitator 1 according to an embodiment of the disclosure is provided such that the second electrode 250, in which particles are collected, generates heat while maintaining the function of collecting charged particles using an electric field as it is, and the electrostatic precipitator 1 may sterilize the surface of the second electrode 250 or the surface of the second plane 213.

By sterilizing particles through heat generation, it is possible to sterilize the surface of the second electrode 250 without generating harmful by-products. In addition, energy consumed for heating may be minimized by heating only the second electrode 250 without heating the entire flowing air through internal heating of the electrostatic precipitator 1 that is the sterilization according to the conventional method. Accordingly, the efficiency of the electrostatic precipitator 1 may be increased.

Particularly, as described above, the dust collecting sheet 210 may include the first electrode 240 and the second electrode 250, and include the first sheet 260 and the second sheet 270 on which the first and second electrodes 240 and 250 are arranged.

In addition, the dust collecting sheet 210 may include the first power connector 281 electrically connected to the first electrode 240 and the second power connector 282 electrically connected to the second electrode 250 to allow the second electrode 250 to collect the charged particles.

Additionally, the dust collecting sheet 210 may include the third power connector 290 electrically connected to the second electrode 250 to allow the second electrode 250 to generate heat.

That is, by connecting both of the second power connector 282 provided to generate an electric field together with the first electrode 240 and the third power connector 290 provided to allow the second electrode 250 to generate heat, to the second electrode 250, the second electrode 250 may collect foreign substances and perform heat sterilization of the collected foreign substances.

The first power connector 281 may be formed as a part of the first electrode 240. However, the disclosure is not limited thereto, and the first power connector 281 may be provided as a component that is separated from the first electrode 240 and then laminated to the first electrode 240.

The first power connector 281 may be formed of a carbon film or the like and deposited on the first sheet 260 or may be formed of carbon ink and patterned on the first sheet 260, as mentioned above.

The first power connector 281 may be provided to extend in a first direction (X-axis direction in FIG. 8) in a state in which the dust collecting sheet 210 is unfolded before being bent. The first power connector 281 may extend in the first direction so as to be electrically connected to all of the plurality of first electrodes 240.

The second power connector 282 may be formed as a part of the second electrode 250. However, the disclosure is not limited thereto, and the second power connector 282 may be provided as a component that is separated from the second electrode 250 and then laminated to the second electrode 250.

The second power connector 282 may be formed of a carbon film or the like and deposited on the first sheet 260 or may be formed of carbon ink and patterned on the first sheet 260, as mentioned above.

In the state in which the dust collecting sheet 210 is unfolded before being bent, the second power connector 282 may be provided to extend in the first direction that is the same as the first power connector 281. The second power connector 282 may extend in the first direction so as to be electrically connected to all of the plurality of second electrodes 250.

The third power connector 290 may be provided as a component that is separated from the second electrode 250 and electrically connected to the second electrode 250 through a connection hole 291 to be described later.

The third power connector 290 may be formed of a carbon film or the like and deposited on the second sheet 270 or may be formed of carbon ink and patterned on the first sheet 260.

In the state in which the dust collecting sheet 210 is unfolded before being bent, the third power connector 290 may be provided to extend in the first direction that is the same as the first power connector 281. The third power connector 290 may extend in the first direction so as to be electrically connected to all of the plurality of second electrodes 250.

As described above, in order to allow the first and second power connectors 281 and 282 to receive power from the outside, the width W1 of the first sheet 260 may be greater than the width W2 of the second sheet 270, and the second sheet 270 may be coupled to the central portion of one surface of the first sheet 260 to allow the first and second power connectors 281 and 282 to be exposed to the outside on the first sheet 260.

When it is assumed that, in the dust collecting sheet 210, a region in which the first sheet 260 and the second sheet 270 are overlapped in a direction, in which the first electrode 240 and the second electrode 250 face each other, is referred to as a first region 216, and a region in which the first sheet 260 and the second sheet 270 are not overlapped in the same direction, that is an outer region of the second sheet 270 is referred to as a second region 217, the first and second power connectors 281 and 282 may be arranged in the second region 217.

On the other hand, the third power connector 290 may be arranged in the first region 216. In the first region 216, the third power connector 290 may be arranged on the second sheet 270 without being arranged between the first sheet 260 and the second sheet 270 in the direction in which the first electrode 240 and the second electrode 250 face each other.

Accordingly, even when the third power connector 290 is arranged on the first region 216, the third power connector 290 may be exposed to the outside, and accordingly, may be easily electrically connected to a power supplier 300 to be described later.

Figure 9:
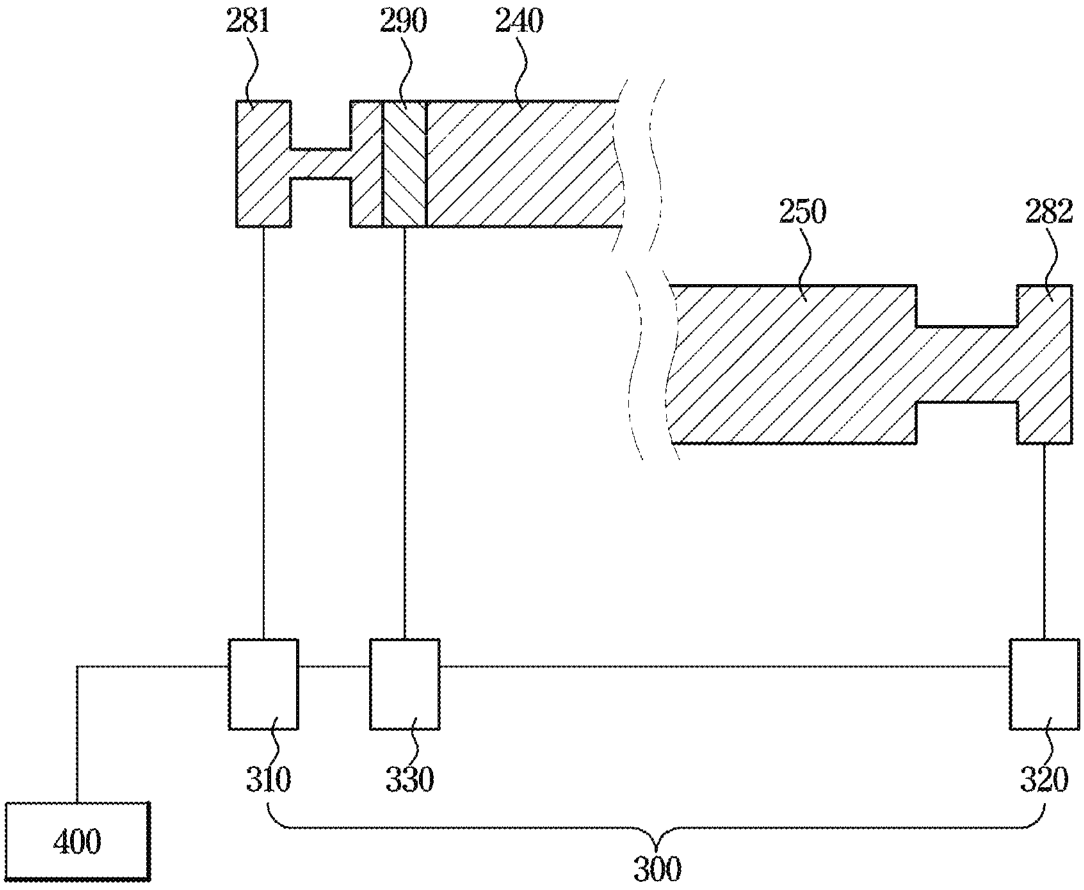
FIG. 9 is a diagram schematically illustrating a part of the electrostatic precipitator according to an embodiment of the disclosure.

FIG. 9 is a diagram schematically illustrating a part of the electrostatic precipitator according to an embodiment of the disclosure.

As shown in FIG. 9, the electrostatic precipitator 1 may include the power supplier 300 configured to supply power to each of the power connectors 281, 282 and 290.

The power supplier 300 may include a first power supplier 310 electrically connected to the first power connector 281, a second power supplier 320 electrically connected to the second power connector 282, and a third power supplier 330 electrically connected to the third power connector 290.

Each of the power suppliers 310, 320, and 330 is a component connected to a first power source (not shown) configured to supply power for the dust collection of the electrostatic precipitator 1 and connected to a second power source (not shown) configured to supply power to allow the second electrode 250 to generate heat for the sterilization of the electrostatic precipitator 1, through various circuits.

The power suppliers 310, 320, and 330 may be electrically connected to the power connectors 281, 282 and 290, respectively, in various ways by driving the first and second power source (not shown) and turning on/off a switch on the circuit.

It is appropriate that the first power supplier 310 and the second power supplier 320 are electrically connected to the first power supplier (not shown), and the second power supplier 320 is provided to be grounded. Accordingly, a potential difference may be generated between the first electrode 240 and the second electrode 250.

In addition, the second power supplier 320 and the third power supplier 330 may be electrically connected to the second power source (not shown), and the second power supplier 320 may be selectively electrically connected to the first power source (not shown) and the second power source (not shown) through various components such as a switch. Accordingly, the power may be applied to the second electrode 250 from the second power source (not shown) to allow current to flow, and the second electrode 250 may generate heat.

The electrostatic precipitator 1 may include a controller 400 configured to control each of the power suppliers 310, 320, and 330.

The electrostatic precipitator 1 may be provided to be driven in any one of a dust collection mode and a sterilization mode by the controller 400.

The controller 400 may be electrically connected to each of the power suppliers 310, 320, and 330 to drive on/off of each of the power suppliers 310, 320, and 330.

Based on the dust collection mode of the electrostatic precipitator 1, the controller 400 may control the first power supplier 310 and the second power supplier 320 to be driven.

In response to power of a predetermined magnitude being applied to the first power supplier 310 and the second power supplier 320 by the controller 400, foreign substances may be collected on the second electrode 250.

Based on the dust collection mode of the electrostatic precipitator 1 continuously performed, foreign substances may be continuously collected on the second plane 213 on which the second electrode 250 is arranged, and harmful substances such as bacteria, viruses and allergens present in the foreign substances may be present continuously or may proliferate.

Accordingly, based on the dust collection mode of the electrostatic precipitator 1 performed for a predetermined period of time, the controller 400 may control the first power supplier 310 and the second power supplier 320 to be turned off.

However, the disclosure is not limited thereto, and in response to a user command, the controller 400 may control each of the power suppliers 310, 320, and 330 to terminate the dust collection mode and switch the mode to the sterilization mode.

The controller 400 may control the electrostatic precipitator 1 to be driven in the sterilization mode, for sterilizing foreign substances collected on the second electrode 250.

Particularly, the controller 400 may control the second power supplier 320 and the third power supplier 330 to be driven.

The controller 400 may control the second power supplier 320 and the third power supplier 330 to allow appropriate power to be supplied to the second electrode 250, thereby allowing the second electrode 250 to generate heat using the power applied to the second electrode 250.

It is appropriate that the second electrode 250 is heated to generate heat between about 40 and 80 degrees Celsius. For this, the second electrode 250 may be formed of a material having high electrical resistance.

Based on the sterilization mode of the electrostatic precipitator 1 continuously performed, the second electrode 250 may generate heat for a predetermined period of time, and accordingly, the sterilization of foreign substances collected on the second surface 213 may be completed.

Based on the sterilization mode for a predetermined period of time, the controller 400 may control the second power supplier 320 and the third power supplier 330 to be turned off.

However, the disclosure is not limited thereto, and in response to a user command, the controller 400 may control each of the power suppliers 310, 320, and 330 to terminate the sterilization mode and switch the mode to the dust collection mode.

That is, in the conventional manner in which an electrostatic precipitation type dust collector collects foreign substances by an electric field generated from a pair of electrodes, it is difficult to prevent the contamination caused by the dispersion of the bio-aerosol of foreign substances continuously collected by any one of the pair of electrodes. However, the electrostatic precipitator according to an embodiment of the disclosure may allow the second electrode 250 to perform the heat sterilization by additionally connecting the third power supplier 330 for heat generation of the second electrode 250 to the second electrode 250, and allow one mode of the dust collection mode and the sterilization mode to be easily driven. Accordingly, the electrostatic precipitator 1 may prevent the electrostatic precipitator 1 from being contaminated by the foreign substances collected on the second electrode 250, and prevent the contamination of indoor air caused by the dispersion of some of the collected foreign substances.

Hereinafter a characteristic in which the third power connector 290 is coupled to the dust collecting sheet 210 and a method of manufacturing the dust collecting sheet 210 including the same will be described in detail.

Figure 10:
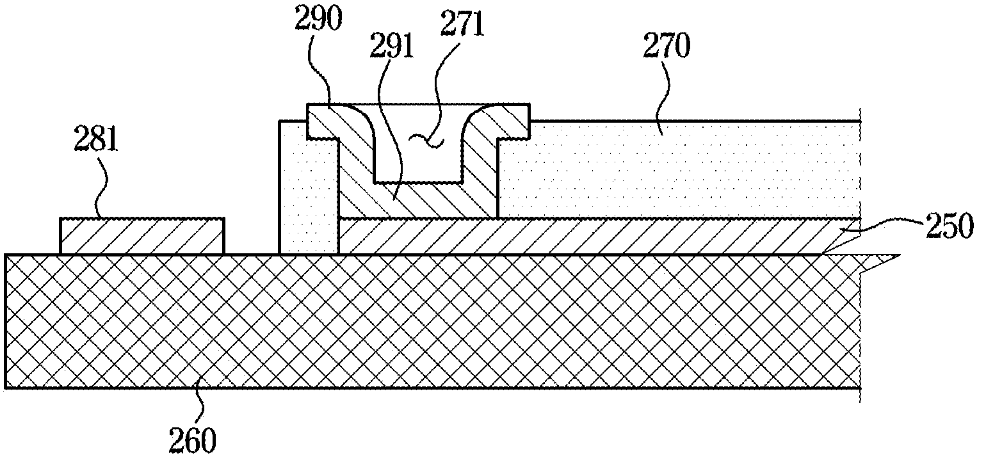
FIG. 10 is an enlarged-side cross sectional view illustrating the dust collecting sheet shown in FIG. 8.

FIG. 10 is an enlarged-side cross sectional view illustrating the dust collecting sheet shown in FIG. 8.

Referring to FIGS. 8 and 10, the third power connector 290 may be arranged in the first region 216. In the first region 216, one surface of the second electrode 250 is covered by the first sheet 260 and the other surface thereof is covered by the second sheet 270, and accordingly, the second electrode 250 is not exposed to the outside. Therefore, it may be difficult for the third power connector 290 and the second electrode 250 to be electrically connected to each other.

Accordingly, the second sheet 270 of the dust collecting sheet 210 according to an embodiment of the disclosure may include a connection hole 271 provided to expose at least a portion of the second electrode 250 to the outside.

The connection hole 271 may be provided in a number corresponding to the number of the second electrodes 250 arranged between the first sheet 260 and the second sheet 270.

On the dust collecting sheet 210, the connection hole 271 may be arranged adjacent to the side opposite to the side on which the second power connector 282 is arranged. Particularly, the connection hole 271 may be arranged closer to the first power connector 281 than the second power connector 282.

This is in order that the third power connector 290, which is connected to the second electrode 250 through the connection hole 271, is arranged on a side opposite to the side on which the second power connector 282 is arranged.

Accordingly, based on the sterilization mode of the electrostatic precipitator 1, the second power connector 282 and the third power connector 290, which are arranged at opposite ends of the second electrode 250, may apply power to the second electrode 250 so as to allow the second electrode 250 to efficiently generate heat.

The connection hole 271 may be arranged in a direction corresponding to the direction in which the second electrode 250 is arranged. That is, the connection holes 271 may be arranged to be spaced apart from each other in the first direction.

As described above, the third power connector 290 may be arranged in the first region 216 and extend in a direction corresponding to the first direction in which the first power connector 281 and the second power connector 282 extend.

Particularly, the third power connector 290 may extend along the first direction on the connection hole 271 spaced apart along the first direction. Accordingly, all connection holes 271 formed on the second sheet 270 may be provided to be covered by the third power connector 290.

As described above, the third power connector 290 may be deposited on the second sheet 270 through a carbon film or carbon ink, and in response to the deposition of the third power connector 290 on the second sheet 270, at least a portion 291 of the third power connector 290 overlapped with the connection hole 271 may be inserted into the connection hole 271 and then deposited on the second sheet 270.

Accordingly, the at least a portion 291 of the third power connector 290 inserted into the connection hole 271 may be in contact with at least a portion of the second electrode 250 exposed to the outside through the connection hole 271 and thus the third power connector 290 may be electrically connected to the second electrode 250.

Figure 11:
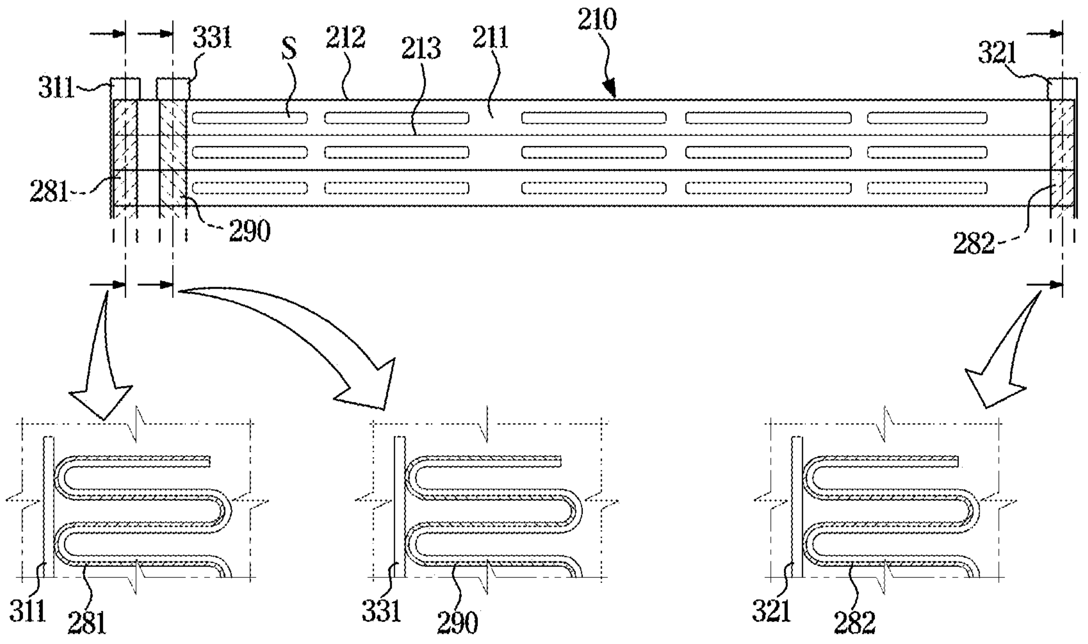
FIG. 11 is a view illustrating a connection between the dust collecting sheet and a power supplier of the electrostatic precipitator according to an embodiment of the disclosure.

FIG. 11 is a view illustrating a connection between the dust collecting sheet and the power supplier of the electrostatic precipitator according to an embodiment of the disclosure.

As described above, each of the power connectors 28, 282 and 290 is provided to extend in the first direction on the dust collecting sheet 210 before being bent. As shown in FIG. 11, in response to the dust collecting sheet 210 being bent, at least a portion of each of the power connectors 281, 282 and 290 may be arranged on the bending member 211.

The first power supplier 310 may include a first contactor 311 in contact with the first power connector 281. The second power supplier 320 may include a second contactor 321 in contact with the second power connector 282. The third power supplier 330 may include a third contactor 331 in contact with the third power connector 290.

Each of the contactors 311, 321, and 331 may be provided to be in contact with at least a portion of each of the power connectors 281, 282 and 290 arranged on the bending member 211. In response to bending the dust collecting sheet 210, each of the power connectors 281, 282 and 390 arranged on the first plane 212 and the second plane 213 are arranged inside a concavo-convex structure of the dust collecting sheet 210 formed through bending, and thus it is not easy for the power connectors 281, 282 and 390 to be in contact with the outside.

However, at least a portion of each of the power connectors 281, 282 and 290 arranged on the bending member 211 may be easily exposed to the outside so as to be easily in contact with each of the contractor 311, 321, and 331 extending from the outside.

The each of the contactors 311, 321, and 331 and the each of the power connectors 281, 282, and 290 may be in contact with each other, and thus the each of the power suppliers 310, 320, and 330 may be configured to apply power to the first electrode 240 and the second electrode 250 according to the control of the controller 400.

Hereinafter a method of manufacturing the dust collecting sheet 210 will be described in detail.

Figure 12:
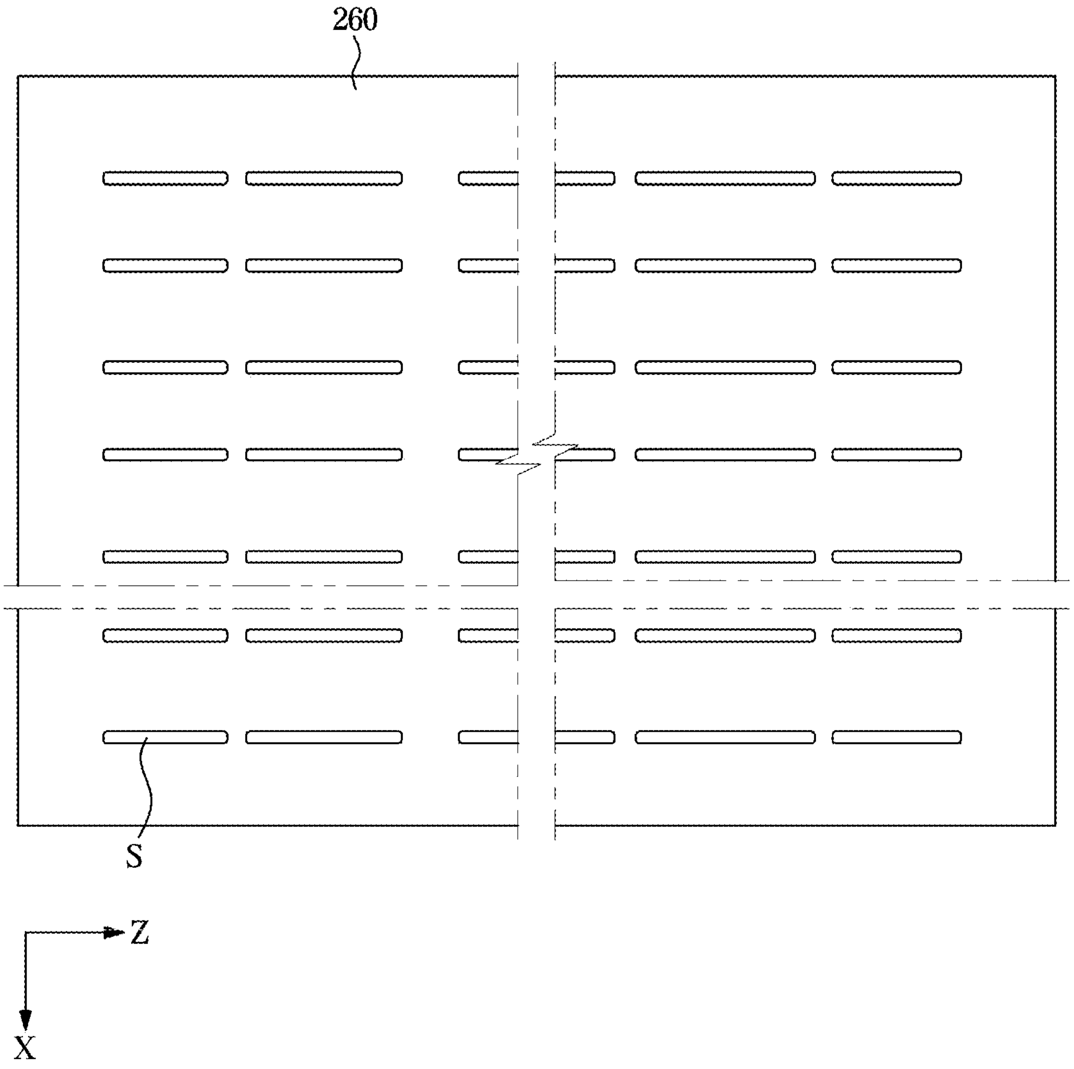
FIG. 12 is a view illustrating a first operation of a manufacturing process of the dust collecting unit according to an embodiment of the disclosure.
Figure 13:
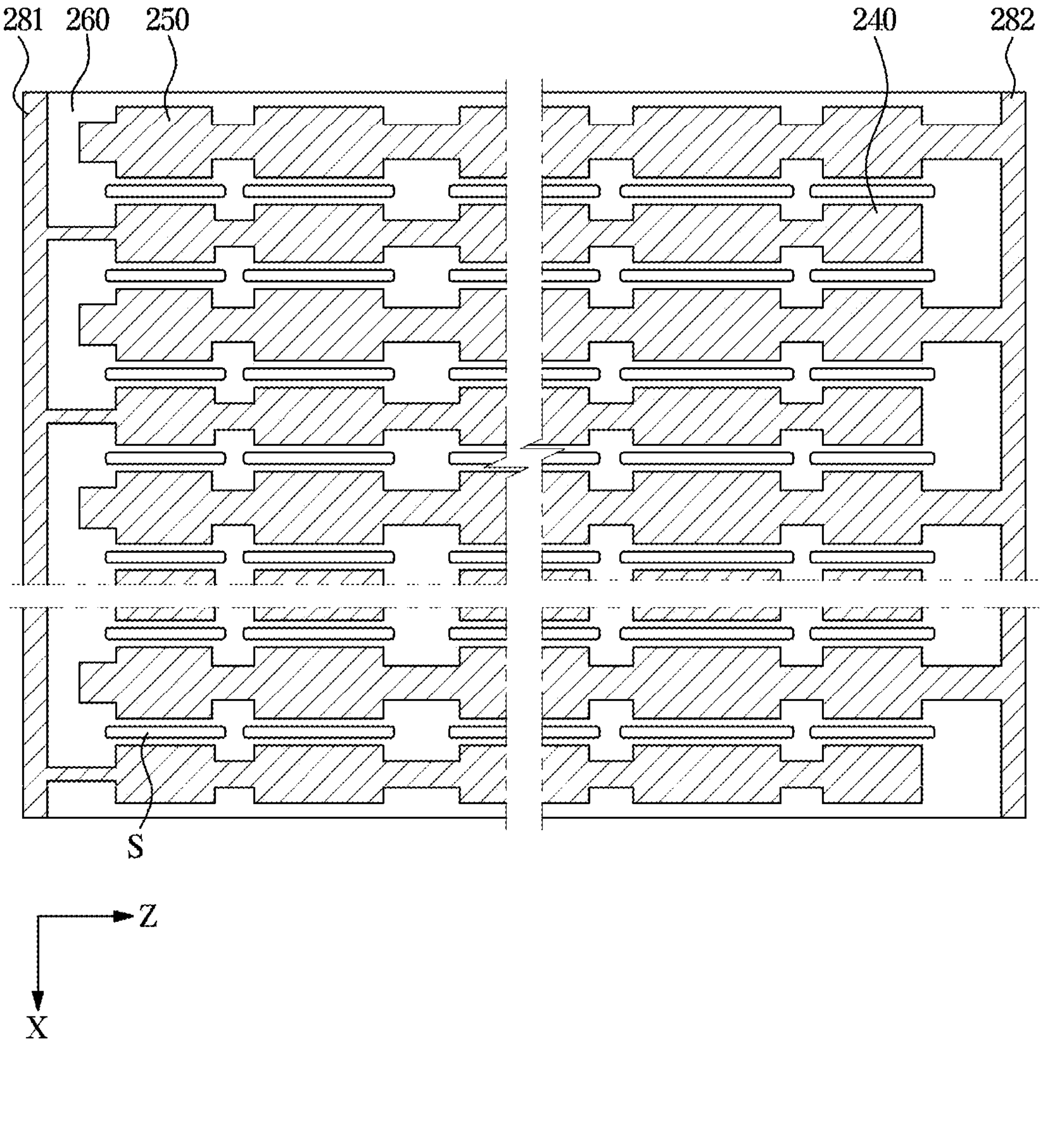
FIG. 13 is a view illustrating a second operation of the manufacturing process of the dust collecting unit according to an embodiment of the disclosure.
Figure 14:
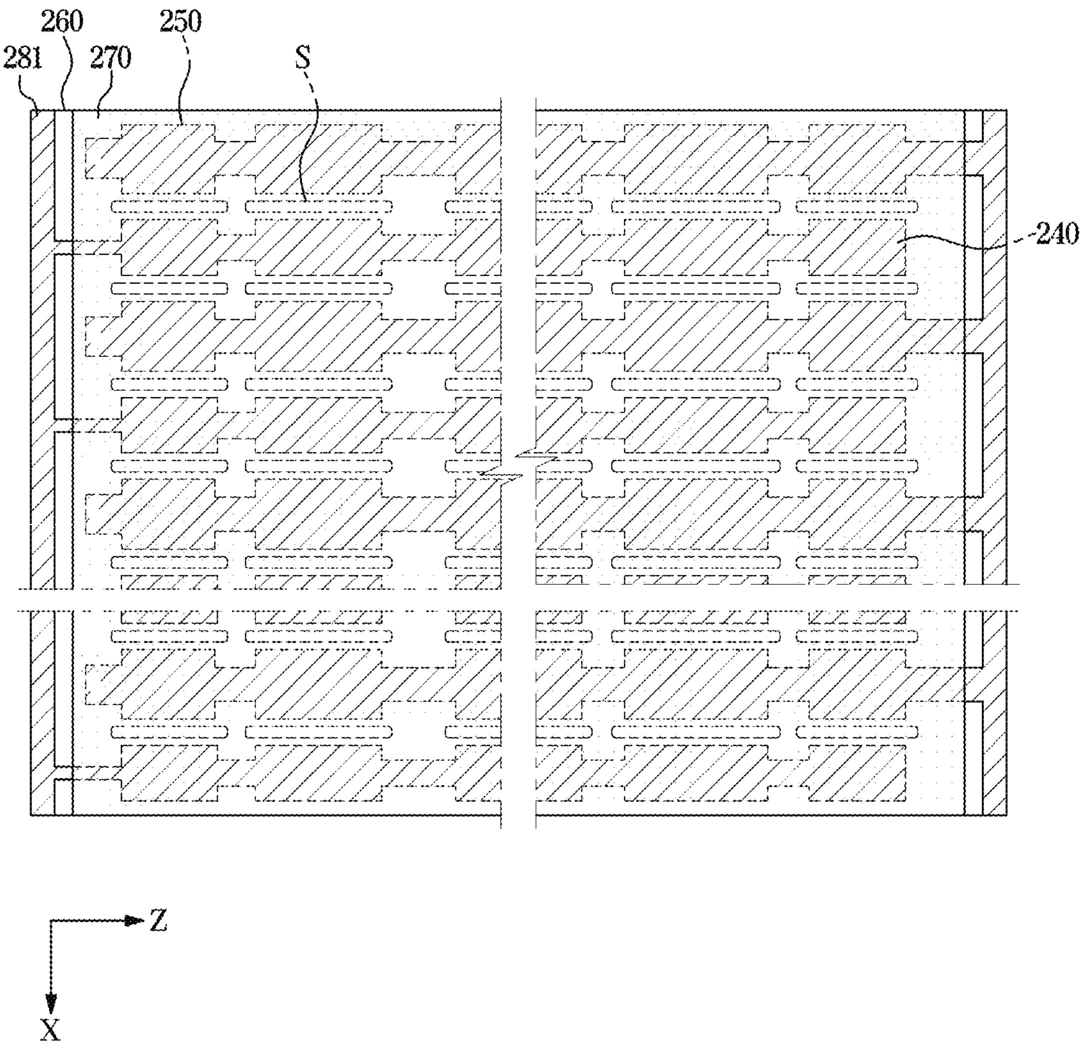
FIG. 14 is a view illustrating a third operation of the manufacturing process of the dust collecting unit according to an embodiment of the disclosure.
Figure 15:
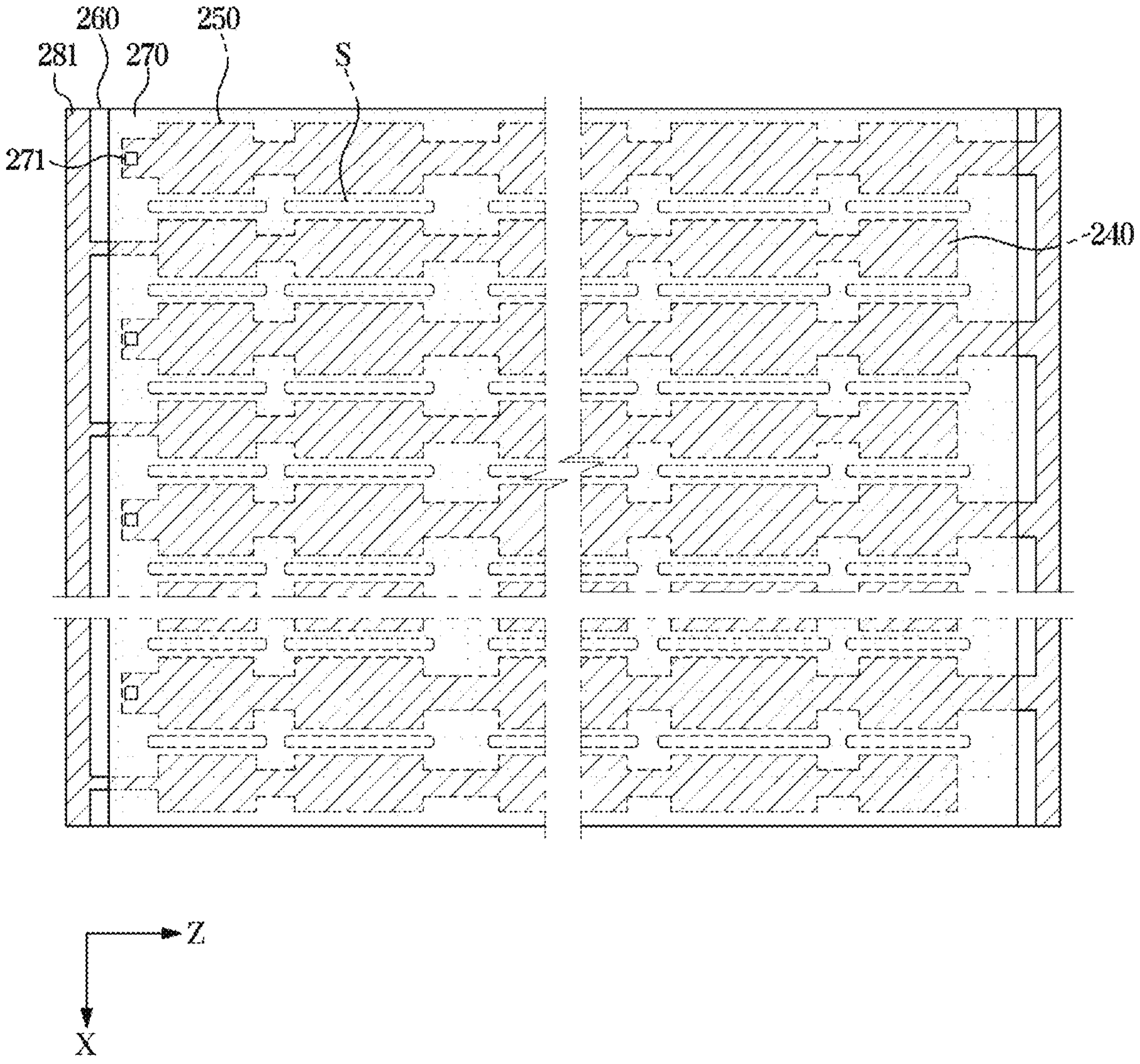
FIG. 15 is a view illustrating a fourth operation of the manufacturing process of the dust collecting unit according to an embodiment of the disclosure.
Figure 16:
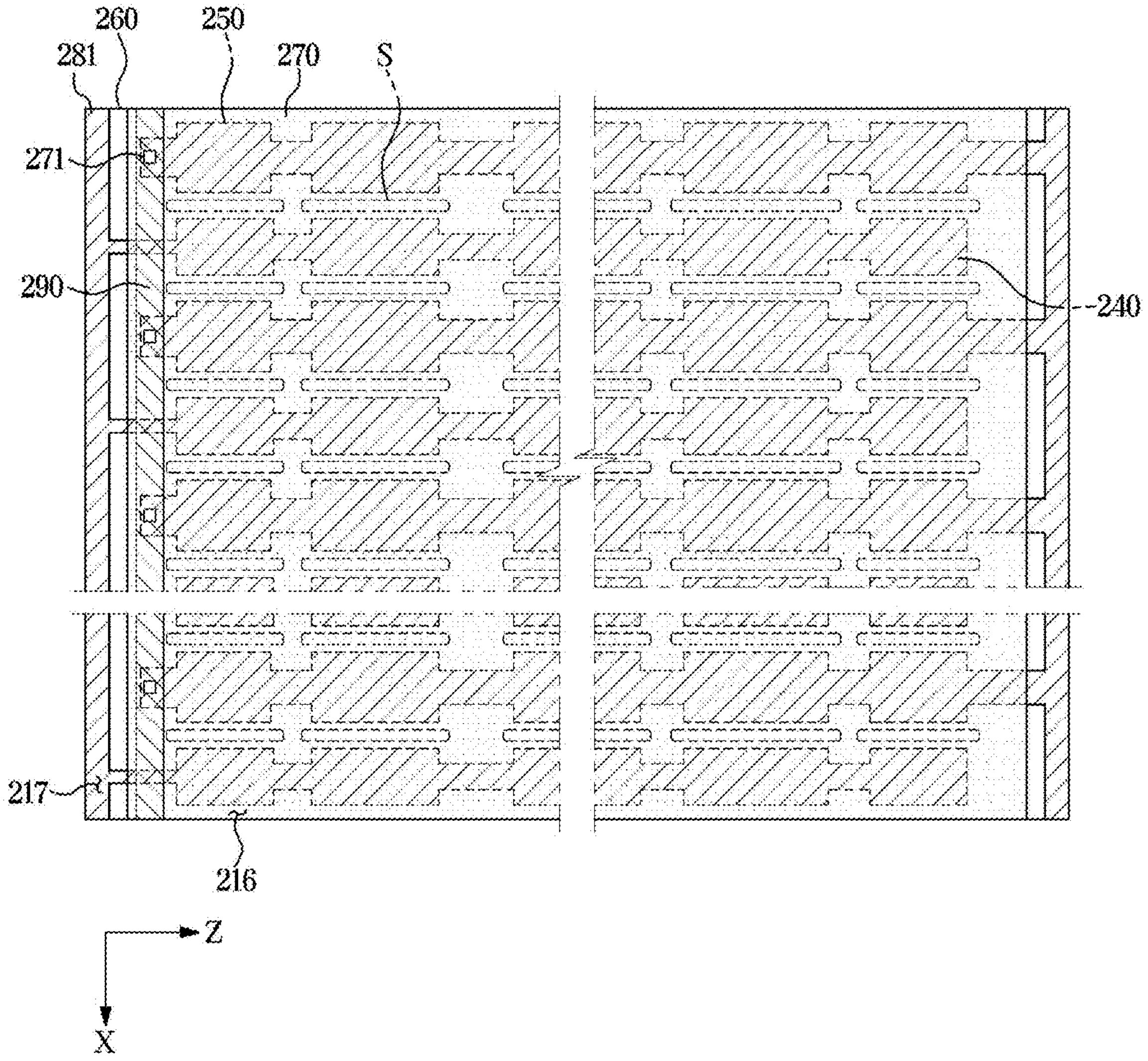
FIG. 16 is a view illustrating a fifth operation of the manufacturing process of the dust collecting unit according to an embodiment of the disclosure.
Figure 17:
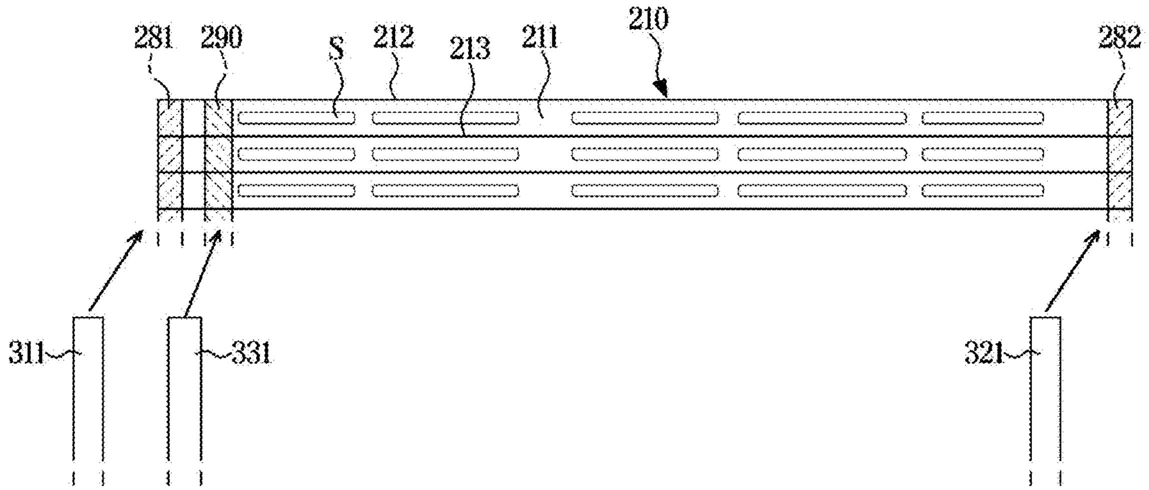
FIG. 17 is a view illustrating a sixth operation of the manufacturing process of the dust collecting unit according to an embodiment of the disclosure.

FIG. 12 is a view illustrating a first operation of a manufacturing process of the dust collecting unit according to an embodiment of the disclosure, FIG. 13 is a view illustrating a second operation of the manufacturing process of the dust collecting unit according to an embodiment of the disclosure, FIG. 14 is a view illustrating a third operation of the manufacturing process of the dust collecting unit according to an embodiment of the disclosure, FIG. 15 is a view illustrating a fourth operation of the manufacturing process of the dust collecting unit according to an embodiment of the disclosure, FIG. 16 is a view illustrating a fifth operation of the manufacturing process of the dust collecting unit according to an embodiment of the disclosure, and FIG. 17 is a view illustrating a sixth operation of the manufacturing process of the dust collecting unit according to an embodiment of the disclosure.

At a first operation, the first sheet 260 in the unfolded state is arranged, as shown in FIG. 12. The slit S may be formed on the first sheet 260. However, the disclosure is not limited thereto, and an operation, in which the first sheet 260 without the slit S is laminated to the second sheet 270 without the slit S and then the slit S is formed on the dust collecting sheet 210, may be added to the manufacturing process.

The first sheet 260 may be formed of a plastic film, and for example, the first sheet 260 may be formed of a transparent insulating material, such as a polyethylene terephthalate (PET) film.

At a second operation, the plurality of first and second electrodes 240 and 250 is coupled to one surface of the first sheet 260, as shown in FIG. 13. As described above, the plurality of first and second electrodes 240 and 250 may be coupled to the first sheet 260 such that conductive carbon ink is printed on one surface of the first sheet 260 or a carbon film or aluminum is deposited on one surface of the first sheet 260. Accordingly, the plurality of first and second electrodes 240 and 250 may be provided as electrode patterns formed on one surface of the first sheet 260.

Further, in the process of printing or depositing the plurality of first and second electrodes 240 and 250, the first and second power connectors 281 and 282 configured to apply power to the plurality of first and second electrodes 240 and 250 may be formed on one surface of the first sheet 260 in the same method. However, as described above, the first and second power connectors 281 and 282 may be provided as a part of the first and second electrodes 240 and 250, respectively, and simultaneously formed on the first sheet 260.

In addition, as for coupling the plurality of first and second electrodes 240 and 250 to one surface of the first sheet 260, a plurality of electrode patterns may be printed side by side on one surface of the first sheet 260 without distinction between the first electrode 240 and the second electrode 250, and then by applying different polarities to the electrode patterns facing each other among the plurality of electrode patterns, the first electrode composed of the high voltage electrode and the second electrode composed of the low voltage electrode may be formed.

As mentioned above, the plurality of first and second electrodes 240 and 250 and the first and second power connectors 281 and 282 is formed on one surface of the first sheet 260 as the conductive pattern through the printing of the carbon ink or the deposition of the carbon film or aluminum. Therefore, it is possible to easily and quickly form the plurality of first and second electrodes 240 and 250 in various shapes and forms.

At a third operation, the second sheet 270 is coupled to the one surface of the first sheet 260 on which the plurality of first and second electrodes 240 and 250 is arranged, as shown in FIG. 14.

The second sheet 270 may be a film formed of the same material as the first sheet 260. The second sheet 270 may be laminated on one surface of the first sheet 260 through an adhesive or the like, and thus the dust collecting sheet 210 may be provided as a single sheet in which the first sheet 260 and the second sheet 270 are integrally coupled to each other.

Accordingly, the plurality of first electrodes 240 and the plurality of second electrodes 250 may be alternately arranged inside the dust collecting sheet 210, and the dust collecting unit 200 configured to adsorb the charged contaminants may be provided by bending the dust collecting sheet 210 in the form of a zigzag.

As described above, by allowing the width of the second sheet 270 to be less than the width of the first sheet 260, the first and second power connectors 281 and 282 arranged on the one surface of the first sheet 260 may be exposed to the outside.

As described above, based on the slit S not being formed on the first and second sheets 260 and 270, the plurality of slits S may be formed between the plurality of first electrodes 240 and the plurality of second electrodes 250 after the third operation.

At a fourth operation, on the second sheet 270, the plurality of connection holes 271 may be formed at positions corresponding to the plurality of second electrodes 250, as shown in FIG. 15.

As described above, the plurality of connection holes 271 may be formed on a side adjacent to the first power connector 281.

At a fifth operation, the third power connector 290 is coupled on the second sheet 270, as shown in FIG. 16. The third power connector 290 may be formed in a conductive pattern through the printing of the carbon ink or the deposition of the carbon film or aluminum. Particularly, the third power connector 290 may be patterned in the direction corresponding to the direction in which the first and second power connectors 281, and 282 extend.

As described above, the third power connector 290 may be coupled to the second sheet 270 such that the third power connector 290 extends in the same direction as the direction, in which the plurality of connection holes 271 is arranged, and is overlapped with the plurality of connection holes 271 so as to cover all the plurality of connection holes 271.

At a sixth operation, the dust collecting sheet 210 is bent in the form of a zigzag to allow the plurality of first electrodes 240 and the plurality of second electrodes 250 to face each other, as shown in FIG. 17.

As the dust collecting sheet 210, in which the plurality of slits S is formed, is bent in the form of a zigzag with respect to the plurality of slits S, the plurality of bending members 211 may be formed. Accordingly, the plurality of first and second planes 212 and 223 may be formed to allow the plurality of first electrodes 240 and the plurality of second electrodes 250 to face each other.

In addition, as the dust collecting sheet 210 is bent in the form of a zigzag with respect to the plurality of slits S, at least a portion of each of the power connectors 281, 282 and 290 may be positioned on the bending member 211.

The first contactor 311 may be arranged to be in contact with at least a portion of the first power connector 281 positioned on the bending member 211. The second contactor 321 may be arranged to be in contact with at least a portion of the second power connector 282 positioned on the bending member 211. The third contactor 331 may be arranged to be in contact with at least a portion of the third power connector 290 positioned on the bending member 211.

Hereinafter a dust collecting sheet 210 according to another embodiment of the disclosure will be described. Configurations other than the third power connector 290' described below are the same as those of the dust collecting sheet 210 according to an embodiment of the disclosure described above, and the same descriptions will be omitted.

Figure 18:
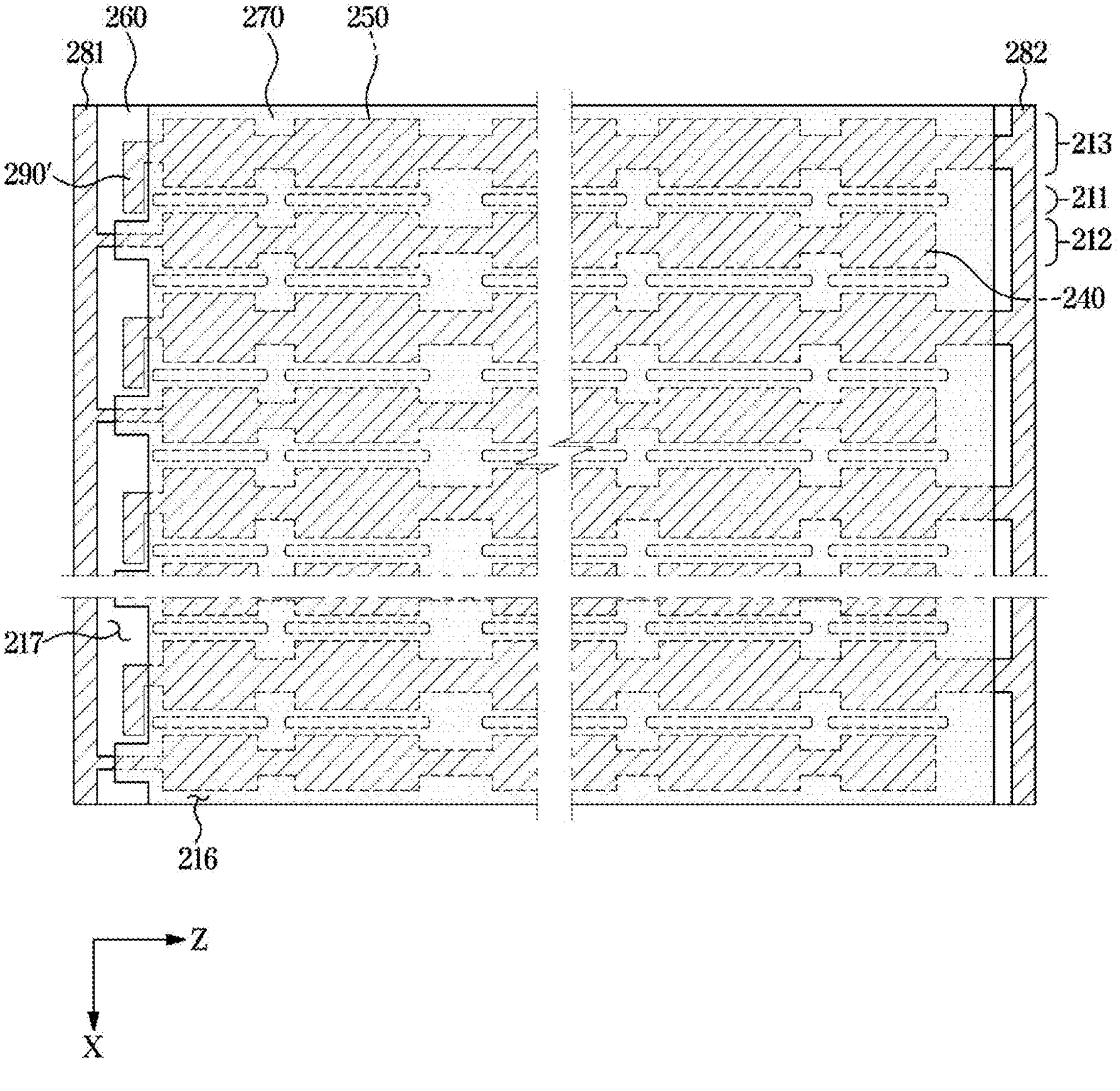
FIG. 18 is a plan view illustrating a state in which a dust collecting sheet of an electrostatic precipitator according to another embodiment of the disclosure is unfolded before being bent.
Figure 19:
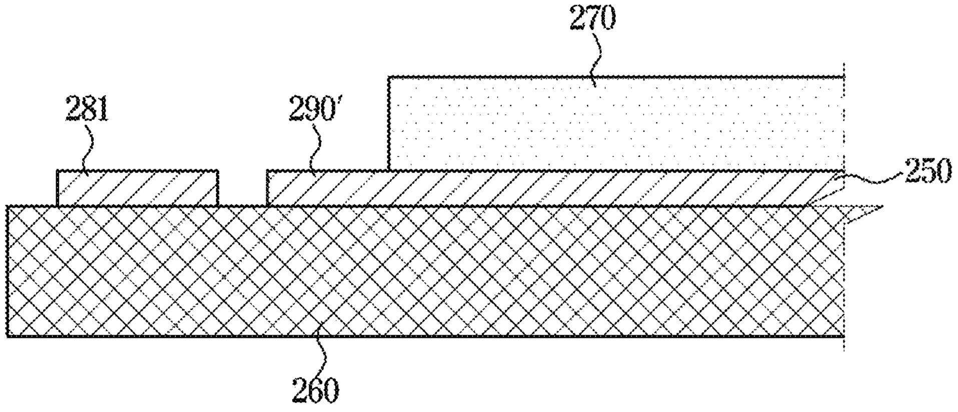
FIG. 19 is an enlarged-side cross sectional view illustrating the dust collecting sheet shown in FIG. 18.
Figure 20:
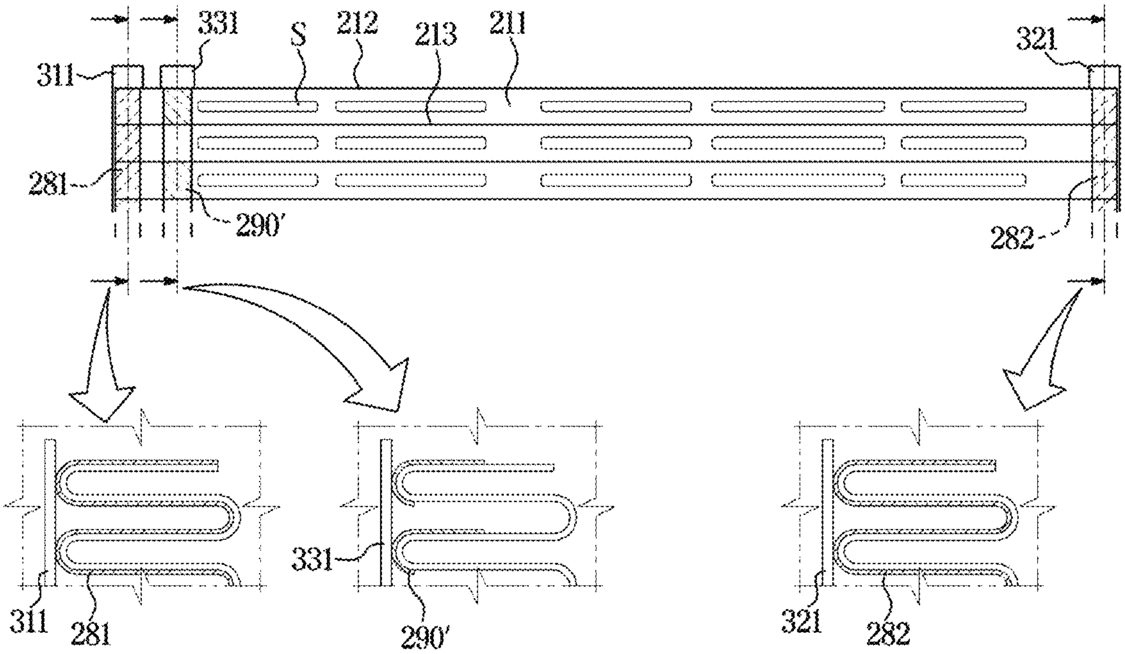
FIG. 20 is a view illustrating a connection between the dust collecting sheet and a power supplier shown in FIG. 18.

FIG. 18 is a plan view illustrating a state in which a dust collecting sheet of an electrostatic precipitator according to another embodiment of the disclosure is unfolded before being bent, FIG. 19 is an enlarged-side cross sectional view illustrating the dust collecting sheet shown in FIG. 18, and FIG. 20 is a view illustrating a connection between the dust collecting sheet and a power supplier shown in FIG. 18.

As illustrated in FIGS. 18 to 20, the third power connector 290' may correspond to a component separated from the second electrode 250 and electrically connected to the second electrode 250 through the connection hole 291 described below.

Unlike the third power connector 290 according to an embodiment of the disclosure, the third power connector 290' according to another embodiment of the disclosure may be arranged in the second region 217.

The third power connector 290' may be provided as a separate component in contact with the second electrode 250 in the Z-axis direction in FIG. 18, but is not limited thereto. Alternatively, the third power connector 290' may be formed as a part of the second electrode 250.

Based on the third power connector 290' being formed as a part of the second electrode 250, at least a portion of the second electrode 250 arranged in the second region 217 of the second electrode 250 may be provided as the third power connector 290'.

Conversely, based on the third power connector 290' being provided as a component separated from the second electrode 250, the second electrode 250 may be provided such that one surface and the other surface thereof are covered by the first sheet 260 and the second sheet 270, and the third power contactor 290' in contact in the Z-axis direction is provided to be exposed to the outside. Accordingly, the third power contactor 290' may be electrically connected to the third power supplier 330.

As illustrated in FIG. 19, as the third power connector 290' is arranged in the second region 217 partially exposed to the outside, the third power connector 290' may be easily in contact with the third power supplier 330 even when the connection hole 271 of the dust collecting sheet 210 according to an embodiment of the disclosure is not formed.

The third power connector 290' may be provided in a number corresponding to the number of the plurality of second electrodes 250.

The third power connector 290' may extend from the second electrode 250 in the Z-axis direction, and partially extend in a direction corresponding to the longitudinal direction of the first power connector 281 and the second power connector 282.

Accordingly, in response to bending the dust collecting sheet 210, at least a portion of the third power connector 290' may be positioned on the bending member 211, as shown in FIG. 20. The each of the contactors 311, 321, and 331 may be provided to be in contact with at least a portion of each of the power connectors 281, 282 and 290' arranged on the bending member 211.

As is apparent from the above description, by additionally connecting a power source, which is for dust collection, and a power source, which is for heat sterilization of an electrode, to a plurality of electrodes, a dust collecting unit may sterilize the electrode while collecting dust and thus it is possible to improve cleanliness of an electrostatic precipitator.

A dust collecting unit is provided such that a plurality of electrodes is integrally formed with a dust collecting sheet, and power for dust collection and power for sterilization is easily connected to the dust collecting unit that is integrally formed. Therefore, it is possible to manufacture an electrostatic precipitator with a simplified manufacturing process and with reduced manufacturing cost.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An electrostatic precipitator comprising:

a charger configured to charge foreign substances introduced thereto; and a dust collecting sheet on which the charged foreign substances are collected, the dust collecting sheet comprising:

a first electrode;

a second electrode spaced apart from the first electrode to face the first electrode and on which the foreign substances passed through the charger are collected, wherein the second electrode formed of a material having an electrical resistance greater than an electrical resistance of the first electrode, and the first electrode and the second electrode are arranged to be overlapped with each other in a first direction;

a first power connector electrically connected to the first electrode to apply a voltage to the first electrode;

a second power connector electrically connected to the second electrode to apply a voltage having a potential difference with the first electrode, to the second electrode;

a third power connector additionally electrically connected to the second electrode while not connecting to the first electrode, to apply additional voltage to allow the second electrode to generate heat;

a first sheet to cover one surface of the first electrode and the second electrode in the first direction; and a second sheet to cover an other surface of the first electrode and the second electrode in the first direction, the second sheet including a connection hole opened in the first direction to connect the second electrode and the third power connector to each other so that the third power connector is in contact with the second electrode through the connection hole, wherein:

the first power connector, the second power connector are arranged on the first sheet, and the third power connector is arranged on the second sheet;

at least a portion of the third power connector is inserted into the connection hole and deposited in the second sheet thereby covering the connection hole;

the at least a portion of the third power connector is in contact with at least a portion of the second electrode exposed to through the connection hole thereby electrically connecting the third power connector with the second electrode; and both of the second power connector, provided to generate an electric field between the first electrode and the second electrode, and the third power connector, provided to allow the second electrode to generate heat, are connected to the second electrode.

2. The electrostatic precipitator of claim 1, wherein the first power connector is arranged at one end of the dust collecting sheet in a second direction which is perpendicular to the first direction, the second power connector is arranged at an other end of the dust collecting sheet in the second direction, and the third power connector is arranged adjacent to the first power connector in the second direction.

3. The electrostatic precipitator of claim 1, wherein the dust collecting sheet comprises a first region in which the first sheet and the second sheet are overlapped and covered with each other in the first direction, and a second region arranged outside the second sheet in the first direction, and the first power connector and the second power connector are arranged in the second region.

4. The electrostatic precipitator of claim 3, wherein the third power connector is arranged in the first region.

5. The electrostatic precipitator of claim 3, wherein at least a portion of the second electrode is arranged in the second region, and the third power connector is in contact with the at least a portion of the second electrode arranged in the second region.

6. The electrostatic precipitator of claim 1, wherein the second electrode is made of a metal material.

7. The electrostatic precipitator of claim 1, wherein the dust collecting sheet further comprises a first plane on which the first electrode is arranged, a second plane on which the second electrode is arranged, and a bending part bent to allow the first plane and the second plane to face the first direction, and at least a portion of each of the first power connector, the second power connector, and the third power connector is arranged in the bending part.

8. The electrostatic precipitator of claim 7, wherein each of the first power connector, the second power connector, and the third power connector is extended along the first plane, the bending part, and the second plane, sequentially.

9. The electrostatic precipitator of claim 1, further comprising:

a first power supplier electrically connected to the first power connector;

a second power supplier electrically connected to the second power connector;

a third power supplier electrically connected to the third power connector; and a controller configured to control the first power supplier, the second power supplier, and the third power supplier to respectively supply power to the first power connector, the second power connector, and the third power connector, wherein the controller is configured to control the first power supplier, the second power supplier, and the third power supplier to selectively drive one of a first operation mode, in which the first power supplier and the second power supplier are controlled to apply a voltage to the first power connector and the second power connector, and a second operation mode, in which the second power supplier and the third power supplier are controlled to apply power to the second power connector and the third power connector.

10. The electrostatic precipitator of claim 9, wherein the controller is configured to, based on a first selected time or an input value, control the first operation mode to be turned off after being turned on, and in response to the first operation mode being turned off, the controller is configured to control the second operation mode to be turned off after being turned on for a second selected time.

* * * * *